United States Patent
Mahmoudkhani et al.

(10) Patent No.: US 12,338,391 B2
(45) Date of Patent: Jun. 24, 2025

(54) MICROBIAL SURFACTANTS TO PREVENT AND/OR REMOVE ASPHALTENE DEPOSITS

(71) Applicant: Locus Solutions IPCo, LLC, Solon, OH (US)

(72) Inventors: Amir Mahmoudkhani, Solon, OH (US); Jonathan Rogers, Solon, OH (US); Janaina Izabel Da Silva De Aguiar, Solon, OH (US)

(73) Assignee: LOCUS SOLUTIONS IPCO, LLC, Solon, OH (US)

( * ) Notice: Subject to any disclaimer, the term of this patent is extended or adjusted under 35 U.S.C. 154(b) by 0 days.

(21) Appl. No.: 17/770,842

(22) PCT Filed: Apr. 16, 2021

(86) PCT No.: PCT/US2021/027799
§ 371 (c)(1),
(2) Date: Apr. 21, 2022

(87) PCT Pub. No.: WO2021/212051
PCT Pub. Date: Oct. 21, 2021

(65) Prior Publication Data
US 2023/0086243 A1    Mar. 23, 2023

Related U.S. Application Data

(60) Provisional application No. 63/010,910, filed on Apr. 16, 2020.

(51) Int. Cl.
*C09K 8/524* (2006.01)
(52) U.S. Cl.
CPC .................................. *C09K 8/524* (2013.01)

(58) Field of Classification Search
None
See application file for complete search history.

(56) References Cited

U.S. PATENT DOCUMENTS

| | | | |
|---|---|---|---|
| 2015/0299556 A1 * | 10/2015 | Gunawan | C09K 8/54 507/260 |
| 2015/0300139 A1 | 10/2015 | Armstrong et al. | |
| 2021/0115321 A1 * | 4/2021 | Deshpande | C10G 21/003 |

FOREIGN PATENT DOCUMENTS

| | | | |
|---|---|---|---|
| WO | 2018107162 A1 | 6/2018 | |
| WO | 2018191174 A1 | 10/2018 | |
| WO | WO-2018237137 A1 * | 12/2018 | C09K 8/60 |

OTHER PUBLICATIONS

De Brito, D.A., Biosurfactants from renewable raw materials, Universidade do Minho Departamento de Engenharia Biologica, Portugal, Nov. 2013, pp. 1-73.
Liu, X., et al., "Recovery of crude oil from oily sludge in an oilfield by sophorolipid." Petroleum Science and Technology, 2019, 37(13): 1582-1588.

* cited by examiner

*Primary Examiner* — Christopher M Rodd
(74) *Attorney, Agent, or Firm* — SALIWANCHIK, LLOYD & EISENSCHENK

(57) ABSTRACT

The subject invention provides compositions and methods for improving oil and/or gas production efficiency. In some embodiments, the compositions and methods utilize microbial surfactants, namely, glycolipids, to prevent the flocculation, precipitation and/or deposition of asphaltenes present in crude oil.

8 Claims, 6 Drawing Sheets

DBSA

Sophorolipids

MICROBIAL SURFACTANTS TO PREVENT AND/OR REMOVE ASPHALTENE DEPOSITS

CROSS-REFERENCE TO RELATED APPLICATION

This application is a National Stage Application of International Application No. PCT/US2021/027799, filed Apr. 16, 2021; which claims priority to U.S. Provisional Patent Application No. 63/010,910 filed Apr. 16, 2020, both of which are incorporated herein by reference in their entirety.

BACKGROUND OF THE INVENTION

Asphalts and asphaltenes are naturally-occurring constituents in crude oils. These materials are dark brown to black, highly viscous materials containing very high molecular weight hydrocarbons that are primarily aromatic in nature, but may also contain varying amounts of sulfur, oxygen, and nitrogen.

Asphaltenes are defined chemically as molecules that are insoluble in light alkanes, such as pentane and heptane, but soluble in aromatic solvents, such as xylene and toluene (Aguiar et al., 2019), carbon disulfide, and chlorinated hydrocarbon solvents, such as chloroform (Speight, 2014). This broad solubility definition covers a wide range of molecules with variable structures, molecular weights, polarity and solubility parameters.

The presence of asphalts and asphaltenes in crude oil and in other fractions of petroleum cause difficulties in the recovery, transportation, and treatment and refining of these crude oils and fractions of crude oils. Asphaltenes can increase the viscosity of oil, stabilize undesirable emulsions between water and oil, deactivate catalysts, and decrease the efficiency of water flooding.

Additionally, asphaltenes flocculate and precipitate under certain conditions, fouling pumps and forming deposits in reservoirs, wellbores, pipelines, equipment and other surfaces, which, even in low concentrations, can partially or completely block the flow of oil. Asphaltene flocculation and/or precipitation are caused by a number of factors including changes in pressure, temperature, and composition, the two most prevalent causes are decreasing pressure and mixing of oil with injected solvents during secondary and tertiary oil recovery processes. Such solvents can include, for example, straight-chain alkanes.

The first step of asphaltene deposition is the adsorption of the asphaltene molecules on a particle, followed by hydrodynamic retention and/or trapping of the particles. Once even a thin layer of asphaltene deposit is formed on a surface, the rate of further accumulation drastically increases. Thus, systematic treatment or removal of deposits is crucial to maintaining properly functioning oil producing facilities. As the thickness of deposits increases over time, the result is a gradual decrease in production. In tubing and casing structures, the deposits begin to reduce the inner diameter of piping and restrict the free flow of oil and gas. As this occurs, the interior roughness of the structures also increases, which raises the pump pressure required to move the petroleum product. If left untreated, deposits can ultimately lead to complete blockage. Furthermore, depending upon the location of the precipitation, maintenance and/or emergency repairs can become extremely expensive.

In fact, hundreds of millions of dollars are spent every year to mitigate asphaltene fouling (Rogel, Ovalles, Moir, 2010), including chemical and mechanical strategies to assess and prevent asphaltene-related problems. Chemical additives can act as inhibitors and/or dispersants, which can be utilized individually or in combined formulations for use in oil fields.

Inhibitors typically affect the flocculation onset point of asphaltene molecules, whereas dispersants typically reduce the size of asphaltene aggregates formed. While inhibitors can sometimes function as dispersants, dispersants typically cannot affect flocculation onset. Normally, dispersants have a polar head that interacts with asphaltenes and an alkyl tail that changes the polarity of the aggregate (Rogel, León, 2001). Examples of dispersants are alkylphenol resins, phosphoric esters, ether carboxylic acids, alkyl pyrrolidines and alkylbenzene sulfonates, such as dodecylbenzyl sulfonic acid (Kelland, 2009).

The chemicals often used to inhibit asphaltene deposition are generally toxic and non-biodegradable (Okafor, Sukirman, Gholami, 2016), leading the oil community to look for cost effective non-toxic, environmentally-friendly alternatives. One such alternative could be microbial surfactants (biosurfactants).

Biosurfactants have found many applications in the pharmaceutical, food, cosmetic, agricultural and textile industries. In the oil industry they have proven efficacy as wax dispersants, pour point depressants and in both the bioremediation and enhanced oil recovery areas (Thompson, Aguiar, 2020, Câmara at el., 2019, El-Sheshtawy, Khidr, 2016, Ren et al., 2020).

Microbial biosurfactants can be divided into the following major classes: Glycolipids, lipopeptides/lipoproteins, phospholipids/fatty acids, polymerics and particulates (Marcelino et al., 2020). Among microbial biosurfactants, the glycolipids class is one of the best-known groups that includes sophorolipids, mannosylerythritol lipids, trehalose lipids, cellobiose lipids and rhamnolipids.

One notable type of glycolipid is the sophorolipid (SLP). SLP consist of β-1,2-bound glucose units connected to a terminal or subterminal hydroxylated long-chain fatty acid. They are produced by several microorganisms, but the most studied species is *Starmerella bombicola* due to its high yield and productivity. The structure of SLP can vary depending on a number of factors including: the type of glycoside, acetylation grade, fatty acid structure and the molecular form (lactonic, linear or bolaform), creating more than 30 possible structures.

SLP have been successfully applied in a wide range of applications including: human cervical cancer treatment, household cleaners, cosmetics and personal care applications, the removal of arsenic from mine tailings, antimicrobial creams to reduce the risk of wound infection during healing, antiviral drugs, agricultural supplements, bioremediation and microbial enhanced oil recovery (Chuo et al., 2019, Ceresa et al., 2019, Ashby et al., 2018, Lydon et al., 2017, Li et al., 2017, Arab, Mulligan, 2016, de Oliveira et al., 2015).

Accumulation of organic deposits in and on oil processing equipment and in the pores of oil-bearing formations can have a compounding effect. Asphaltenes, in particular, are a major problem for the oil industry. Their variability in size, structure and polarity presents a challenge to develop formulations that are effective against precipitation and deposition for all types of asphaltenes. Also, changes in production systems, such as the rate of water break through, can also impact the efficiency of dispersants.

Unless these organic compounds are removed, operators can be faced with lowering yields, improper function of pumps, corroded or blocked tubing and pipes, and potential for total loss of production. Furthermore, cost, safety in processing, large-scale sustainability, and damage to formations must be accounted for when developing methods for removing these deposits to ensure long-term efficiency of hydrocarbon production.

Because of the importance of safe and efficient oil and gas production and the difficulties caused by paraffin deposits in production and transport of oil and gas, there is a continuing need for improved methods of removing these deposits from oil-bearing formations and associated production equipment while also enhancing oil recovery therefrom.

BRIEF SUMMARY OF THE INVENTION

The subject invention provides environmentally-friendly, non-toxic compositions and methods for improving oil and gas production from an oilfield. Specifically, the subject invention provides compositions comprising microbial surfactants, or biosurfactants, as well as methods of their use for preventing the agglomeration, flocculation and/or precipitation of asphaltenes and/or their deposition on the surfaces of, for example, reservoirs, wellbores, pipelines, and other oilfield equipment. In certain embodiments, the compositions and methods can also enhance oil recovery, as well as improve one or more properties of crude oil, such as, for example, viscosity.

In certain embodiments, the compositions and methods of the subject invention can be used to disperse asphaltenes, and/or to maintain suspension of asphaltenes in crude oil and/or crude oil fractions so as to prevent precipitation thereof and formation of deposits.

In preferred embodiments, the subject invention provides methods for improving oil and/or gas production from an oilfield, wherein a composition comprising a glycolipid biosurfactant is contacted with crude oil having asphaltene molecules therein. In certain embodiments, the composition and methods are used for preventing the agglomeration, precipitation (flocculation) and/or deposition of asphaltene molecules.

In certain embodiments, the glycolipid biosurfactant is a sophorolipid (SLP). SLP can be produced by fermentation of a yeast such as, for example, *Starmerella bombicola*, in the presence of a hydrocarbon-based source of one or more fatty acids. The SLP can be purified and/or it can be utilized in crude form, wherein the crude form comprises yeast cells, fermentation broth and/or nutrients that are residual from fermentation. If present, the yeast cells are preferably inactivated prior to use by, for example, heat inactivation.

In preferred embodiments, the SLP are isolated from the yeast culture and purified to at least 90%, more preferably at least 92% purity. In some embodiments, the SLP can be diluted with water.

In one embodiment, the composition utilized according to the subject methods comprises more than one form of SLP, including linear SLP and lactonic SLP. The SLP can be non-acetylated, mono-acetylated and/or di-acetylated SLP. In certain specific embodiments, the composition comprises acetylated and/or non-acetylated linear SLP derived from stearic, oleic and/or linoleic fatty acids.

In some embodiments, when the glycolipid-based composition is contacted with the crude oil, it prevents agglomeration, precipitation and/or deposition of asphaltene molecules by acting as an asphaltene inhibitor, an asphaltene dispersant, and/or both.

In certain embodiments, the glycolipid-based composition is applied to a subterranean formation, an oil and/or gas well, a wellbore, and/or equipment associated therewith in order to prevent precipitation and/or deposition of asphaltenes on such surfaces. For example, the methods are useful for preventing precipitation and/or deposition of asphaltenes in the rock pores of subterranean formations, in oil wells, in wellbores, and on equipment, such as, for example, tubing, pipes, drills and tanks associated with all aspects of oil and/or gas production.

In certain embodiments, the composition can further comprise other substances that are useful for inhibiting and/or dispersing asphaltenes, and/or that are useful for enhancing oil recovery, such as, for example, solvents, non-biological surfactants, enzymes, polymers, and/or chelating agents. Preferably, however, the additional substances are non-toxic and/or biodegradable.

Advantageously, the compositions and methods of the subject invention are useful even when applied in the presence of one or more asphaltene precipitants. Asphaltene precipitants include, for example, alkanes, such as pentane and heptane.

In some embodiments, the subject compositions and methods can also be useful for enhancing oil recovery due to, for example, the amphiphilic properties of the glycolipid biosurfactants, as well as reducing the viscosity of heavy crude oil.

In some embodiments, the enhanced properties of the subject glycolipid-based compositions over chemical or synthetic surfactants are due to the small size of the glycolipid biosurfactants and/or micelles formed by the biosurfactants. The small size of the micelles allows for penetration of the composition into nano-sized spaces and pores on surfaces that may otherwise be passed over by larger-sized synthetic materials. For example, in some embodiments, the size of the glycolipid biosurfactant is less than 500 nm, preferably less than 100 nm, and more preferably, less than 5 nm.

In one embodiment, the subject methods can be used alongside and/or to enhance or supplement other methods of asphaltene inhibition and/or dispersal, and/or enhanced oil recovery, e.g., other microbial, mechanical, thermal and/or chemical treatments.

In certain embodiments, the subject invention can be used for improving, enhancing, and/or maintaining oil recovery from, and operation of, for example, subterranean formations, oil and/or gas wells, boreholes, tubes, pipes, drills, tanks and other structures and equipment involved in oil and/or gas production, transportation, storage and refining. The subject invention can be used in, for example, vertical, horizontal and/or fracking wells, mature wells, stripper (marginal) wells, flowlines, to clean near wellbore zones and to clean storage tanks.

In one embodiment, application of a composition of the subject invention can be performed during drilling operations (e.g., while drilling, while tripping-in or tripping-out of the hole, while circulating mud, while casing, while placing a production liner, and/or while cementing, etc.), and/or as a production treatment (e.g., after oil and/or gas recovery is underway).

In one embodiment, the subject compositions and methods can be used without releasing large quantities of inorganic compounds into the environment. Additionally, the compositions and methods can utilize components, such as biosurfactants, that are biodegradable and toxicologically safe. Thus, while the subject invention can utilize non-biological or synthetic chemical components, the present invention can also be formulated as an environmentally-friendly treatment.

DETAILED DESCRIPTION

Figure 1:
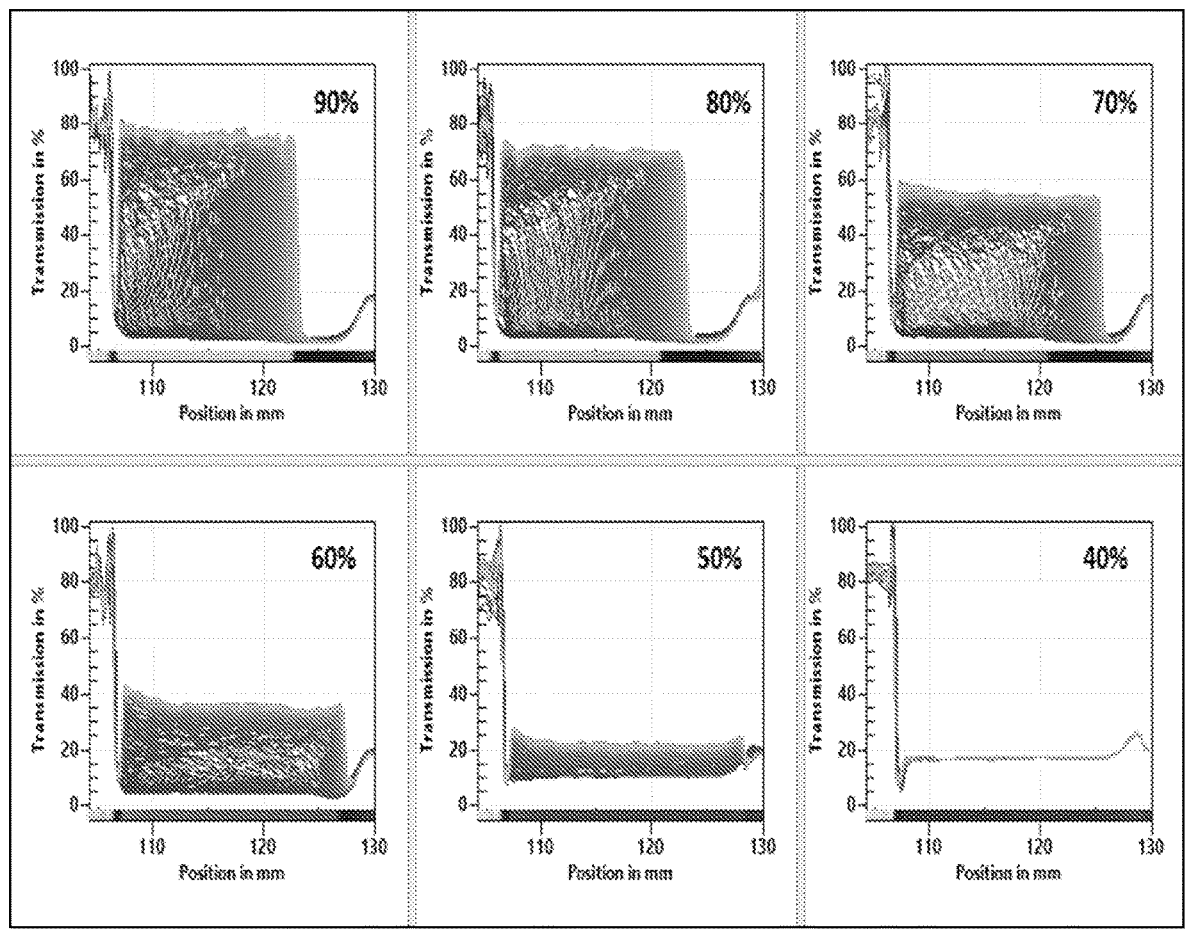
FIG. 1 shows transmission by position of AST for asphaltenes using different concentrations of n-heptane (90, 80, 70, 60, 50, 40% V/V).

The subject invention provides compositions and methods for improving oil and/or gas production, as well as for enhancing oil recovery. In specific embodiments, materials and methods are provided for improving oil and/or gas production by preventing the agglomeration, flocculation and/or deposition of asphaltenic molecules present in crude oil. Advantageously, in certain embodiments, the subject invention can be effective in the presence of asphaltene dispersants, such as heptane and/or pentane.

Selected Definitions

As used herein, "asphaltenes" are dissolved solids components of crude oils that do not dissolve in gases or in alkane liquids. Asphaltenes do, however, dissolve in aromatic hydrocarbons such as toluene or xylene. Asphaltenes are capable of "flocculation," which is the tendency of a molecule to form, or aggregate, into clumps with other molecules. Even a slight change in pressure and/or temperature can create phase instability in the crude oil, resulting in formation of bulk solids and eventual precipitation and deposition thereof onto surfaces.

As used herein, the term "crude oil" includes shale oil; shale gas condensate; bitumen; diluted bitumen (dil-bit); refinery fractions, including distillates and coker distillates; alkylates; finished fuel, including diesel fuel, petroleum fuel and biofuel; finished petroleum products; reformates; cycle oil; residual oil (resid); fuel gas; flare gas; liquefied petroleum gas (LPG), natural gas condensate, natural gas liquid (NGL) and combinations thereof. In addition, any of these may contain water, brines, gases such as hydrocarbon gases, or a combination thereof.

As used herein, "prevention" means avoiding, delaying, forestalling, or minimizing the onset or progression of an occurrence or situation. Prevention can include, but does not require, absolute or complete prevention, meaning the occurrence or situation may still develop at a later time and/or with a lesser severity than it would without preventative measures. Prevention can include reducing the severity of the onset of an occurrence or situation, and/or reducing the progression thereof to one that is more severe.

In certain embodiments, the subject invention can be useful for preventing the flocculation, precipitation and/or deposition of asphaltenes present in crude oil. Thus, in some embodiments, the compositions and methods of the subject invention can be useful as asphaltene "inhibitors" and/or as asphaltene "dispersants."

As used herein, an "inhibitor" is a substance that helps keep asphaltene molecules in solution (i.e., prevents flocculation and/or precipitation) by preventing the aggregation of asphaltene molecules and shifting the asphaltene onset pressure. If an asphaltene inhibitor has certain molecular characteristics, such as, for example, long alkyl chains, it can also help disperse any formed asphaltene aggregates. Therefore, some asphaltene inhibitors can function as asphaltene dispersants.

As used herein, a "dispersant" is a substance that reduces the size of asphaltene particles and aggregates, and reduces asphaltene deposition by keeping asphaltene particles in suspension.

As used herein, an "isolated" or "purified" molecule, is substantially free of other compounds, such as cellular material, with which it is associated as a result of its production, either in nature or in a laboratory setting.

In certain embodiments, purified compounds are at least 60% by weight the compound of interest. Preferably, the preparation is at least 75%, more preferably at least 90%, and most preferably at least 99%, by weight the compound of interest. For example, a purified compound is one that is, preferably, at least 90%, 91%, 92%, 93%, 94%, 95%, 98%, 99%, or 100% (w/w) of the desired compound by weight. Purity is measured by any appropriate standard method, for example, by column chromatography, thin layer chromatography, or high-performance liquid chromatography (HPLC) analysis.

Ranges provided herein are understood to be shorthand for all of the values within the range. For example, a range of 1 to 20 is understood to include any number, combination of numbers, or sub-range from the group consisting 1, 2, 3, 4, 5, 6, 7, 8, 9, 10, 11, 12, 13, 14, 15, 16, 17, 18, 19 and 20, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

As used herein, "reduces" means a negative alteration of at least 10%, 5%, 10%, 250%, 50%, 75%, or 100%, and "increases" means a positive alteration of at least means a negative alteration of at least 1%, 5%, 10%, 25%, 50%, 75%, or 100%.

A "metabolite" refers to any substance produced by metabolism (e.g., a growth by-product) or a substance necessary for taking part in a particular metabolic process. A metabolite can be an organic compound that is a starting material, an intermediate in, or an end product of metabolism. Examples of metabolites include, but are not limited to, enzymes, acids, solvents, gasses, alcohols, proteins, vitamins, minerals, microelements, amino acids, polymers, and surfactants.

As used herein, "surfactant" means a surface-active compound that lowers the surface tension (or interfacial tension) between two liquids, between a gas and a liquid, and/or between a liquid and a solid. A "biosurfactant" is an amphiphilic molecule produced by a living cell and/or produced using natural substrates, such as plant, fungal or animal matter.

The transitional term "comprising," which is synonymous with "including," or "containing," is inclusive or openended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention. Use of the term "comprising" contemplates embodiments that "consist" or "consist essentially" of the recited component(s).

Unless specifically stated or obvious from context, as used herein, the term "or" is understood to be inclusive. Unless specifically stated or obvious from context, as used herein, the terms "a," "and" and "the" are understood to be singular or plural.

Unless specifically stated or obvious from context, as used herein, the term "about" is understood as within a range of normal tolerance in the art, for example within 2 standard deviations of the mean. About can be understood to be within 10%, 9%, 8%, 7%, 6%, 5%, 4%, 3%, 2%, 1%, 0.5%, 0.1%, 0.05%, or 0.01% of the stated value.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof.

All references cited herein are hereby incorporated by reference in their entirety.

Microbial Surfactants to Prevent Asphaltene Deposition

The subject invention provides environmentally-friendly, non-toxic compositions and methods for improving oil and gas production from an oilfield. Specifically, the subject invention provides compositions comprising microbial surfactants, or biosurfactants, as well as methods of their use for preventing the agglomeration, flocculation, precipitation and/or deposition of asphaltenes on the surfaces of, for example, reservoirs, wellbores, pipelines, and other oilfield equipment. In certain embodiments, the compositions and methods can also enhance oil recovery, as well as improve one or more properties of crude oil, such as, for example, viscosity.

In preferred embodiments, the subject invention provides methods for improving oil and/or gas production from an oilfield, wherein a composition comprising a glycolipid biosurfactant is contacted with crude oil having asphaltene molecules therein. In certain embodiments, the composition and methods are used for preventing the agglomeration, flocculation, precipitation and/or deposition of asphaltene molecules.

In certain embodiments, the compositions and methods function surprisingly better than compositions and methods that utilize known chemical asphaltene dispersants and/or inhibitors, such as, for example, dodecylbenzenesulfonic acid (DBSA).

Thus, in one embodiment, the subject invention can replace compositions and methods that utilize synthetic or chemical asphaltene dispersants and inhibiters for preventing agglomeration, flocculation, precipitation and/or deposition of asphaltene. Furthermore, the subject methods can reduce or replace the need for physical alteration of equipment to prevent asphaltene agglomeration, flocculation, precipitation and/or deposition.

In certain embodiments, the glycolipid-based composition comprises components that were produced as the result of the growth of microorganisms or other cell cultures. Thus, the composition may comprise the microbes themselves and/or by-products of microbial growth. In some embodiments, the glycolipids are purified from the cell culture. In some embodiments, they are utilized in crude form, wherein the crude form comprises residual cells, fermentation broth, growth by-products, and/or nutrients from fermentation. The microbes may be in a vegetative state, in spore form, in mycelial form, in any other form of propagule, or a mixture of these. The microbes may be planktonic or in a biofilm form, or a mixture of both. The by-products of growth may be, for example, metabolites, cell membrane components, expressed proteins, and/or other cellular components. The microbes may be intact or lysed, active or inactive. In some embodiments, the microbes are present, with medium in which they were grown, in the composition. The microbes may be present at, for example, a concentration of $1 \times 10^4$, $1 \times 10^5$, $1 \times 10^6$, $1 \times 10^7$, $1 \times 10^8$, $1 \times 10^9$, $1 \times 10^{10}$, $1 \times 10^{11}$, $1 \times 10^{12}$, or $1 \times 10^{13}$ (or any concentration there-between) or more CFU per milliliter of the composition. If present, the yeast cells are preferably inactivated prior to use by, for example, heat inactivation.

In certain embodiments, use of yeast fermentation products according to the subject invention can be superior to, for example, purified microbial metabolites alone, due to, for example, the advantageous properties of the yeast cell walls. These properties include high concentrations of mannoprotein as a part of yeast cell wall's outer surface (mannoprotein is a highly effective bioemulsifier) and the presence of biopolymer beta-glucan (also an effective emulsifier) in yeast cell walls. Additionally, the yeast fermentation product can further comprise biosurfactants capable of reducing both surface and interfacial tension, enzymes capable of solubilizing heavy hydrocarbon and/or paraffinic compounds, and other metabolites (e.g., lactic acid, ethyl acetate, ethanol, etc.), in the culture.

In certain embodiments, the glycolipid biosurfactant is a sophorolipid (SLP). Sophorolipids are glycolipid biosurfactants produced by, for example, various yeasts of the *Starmerella* clade when cultivated in the presence of a hydrocarbon-based source of one or more fatty acids. SLP consist of a disaccharide sophorose linked to long chain hydroxy fatty acids. They can comprise a partially acetylated 2-O-β-D-glucopyranosyl-D-glucopyranose unit attached β-glycosidically to 17-L-hydroxyoctadecanoic or 17-L-hydroxy-Δ9-octadecenoic acid. The hydroxy fatty acid is generally 16 or 18 carbon atoms, and may contain one or more unsaturated bonds. Furthermore, the sophorose residue can be acetylated on the 6- and/or 6'-position(s). The fatty acid carboxyl group can be free (acidic or linear form (General Formula 1)) or internally esterified at the 4"-position (lactonic form (General Formula 2)). *S. bombicola* produces a specific enzyme, called *S. bombicola* lactone esterase, which catalyzes the esterification of linear SLP to produce lactonic SLP.

In preferred embodiments, the SLP according to the subject invention are represented by General Formula (1) and/or General Formula (2), and are obtained as a collection of 30 or more types of structural homologues having different fatty acid chain lengths ($R^3$), and, in some instances, having an acetylation or protonation at $R^1$ and/or $R^2$.

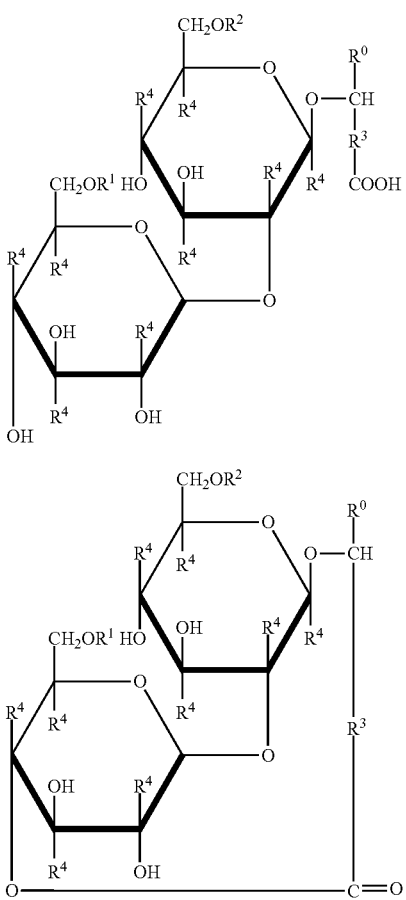

In General Formula (1) or (2), $R^0$ can be either a hydrogen atom or a methyl group. $R^1$ and $R^2$ are each independently a hydrogen atom or an acetyl group. $R^3$ is a saturated aliphatic hydrocarbon chain, or an unsaturated aliphatic hydrocarbon chain having at least one double bond, and may have one or more Substituents. $R^4$ is a methyl group or hydrogen atom.

Examples of the Substituents include halogen atoms, hydroxyl, lower (C1-6) alkyl groups, halo lower (C1-6) alkyl groups, hydroxy lower (C1-6) alkyl groups, halo lower (C1-6) alkoxy groups, and the like. $R^3$ typically has 11 to 20 carbon atoms, preferably 13 to 17 carbon atoms, and more preferably 14 to 16 carbon atoms.

In one embodiment, the composition utilized according to the subject methods comprises more than one form of SLP, including linear SLP and lactonic SLP. The SLP can be non-acetylated, mono-acetylated and/or di-acetylated SLP.

In certain specific embodiments, the composition comprises SLP according to General Formula (1) (linear SLP) wherein R1 and/or R2 are an acetyl group, and wherein R3 is derived from a stearic, oleic and/or linoleic fatty acid.

In some embodiments, the subject glycolipid-based compositions have enhanced asphaltene inhibiting properties over chemical or synthetic surfactants is due to the small size of the glycolipid biosurfactants and/or micelles formed by the biosurfactants. The small size of the micelles allows for penetration of the composition into nano-sized spaces and pores on surfaces that may otherwise be passed over by larger-sized synthetic materials. For example, in some embodiments, the size of the glycolipid biosurfactant is less than 500 nm, preferably less than 100 nm, and more preferably, less than 5 nm. In one example, the glycolipid has a micelle size of 1 nm to 5 nm.

In preferred embodiments, the SLP are isolated from the yeast culture in which they were produced and purified to at least 90%, more preferably at least 92% purity. In certain embodiments the concentration of the SLP that is used is about 5 ppm to about 15,000 ppm, about 10 ppm to about 10,000 ppm, or about 100 ppm to about 600 ppm SLP, relative to the crude oil being treated.

In some embodiments, the SLP can be diluted with about 1 to 10,000 ppm, about 10 to 5,000, or about 100 to about 2,500 ppm water relative to the crude oil being treated.

In certain embodiments, the composition can further comprise other substances that are useful for inhibiting and/or dispersing asphaltenes, and/or that are useful for enhancing oil recovery, such as, for example, solvents, non-biological surfactants, enzymes, polymers, and/or chelating agents. Preferably, however, the additional substances are non-toxic and/or biodegradable. These additional compounds can be added in amounts ranging from, for example, 0.001% to 20% or greater, by weight or volume.

In some embodiments, the glycolipid-based composition further comprises a solvent selected from, for example, terpenes and/or terpenoids (e.g., limonenes, orange terpenes, lemon terpenes, grapefruit terpenes, orange oil, lemon oil, other citrus terpenes, other citrus oils, geraniol, terpineol, dipentene, myrcene, linalool, cymene and pinene), alcohols (e.g., ethanol, methanol, propanol, isopropyl alcohol and/or hexanol), ionic or semi-ionic liquids, acetates (e.g., isoamyl acetate and/or primary amyl acetate), aliphatic and/or aromatic hydrocarbons, olefins, esters, oxygenates, ketones, acetic acid, kerosene, gasoline, diesel, benzene, ethyl benzenes, propyl benzenes, butyl benzenes, toluene, ethyl toluenes, xylene, alkylene amines, carbon disulfide, mesitylene, cumene, cymenes, saturated aliphatic and/or alicyclic hydrocarbons, naphtha, naphthenes, decalin, tetralin, turpentine, carbon tetrachloride, ether alcohol, pinene, dialkyl ether and/or any combination thereof.

In some embodiments, an ionic or semi-ionic liquid can be included in the composition. Exemplary ionic or semi-ionic liquids suitable for the subject composition include, but are not limited to, ethyl ammonium nitrate, and/or a semi-ionic mixture of glycerin/glycerol with magnesium sulfate heptahydrate ($MgSO_4 \cdot 7H_2O$). In one embodiment, the mixture of glycerol and Epsom salt ($MgSO_4 \cdot 7H_2O$) has a ratio of glycerol to Epsom salt of 1:1 to 1:10, or from 1:1 to 10:1.

The subject composition can further comprise one or more ammonium-based compounds. In some embodiments, the ammonium compounds are selected from monoammonium phosphate (or ammonium dihydrogen phosphate) and ammonium hydroxide.

In some embodiments, the composition further comprises one or more chelating agents. As used herein, "chelator" or "chelating agent" means an active agent capable of removing a metal ion from a system by forming a complex so that the metal ion, for example, cannot readily participate in or catalyze oxygen radical formation.

Examples of chelating agents include, but are not limited to, dimercaptosuccinic acid (DMSA), 2,3-dimercaptopropanesulfonic acid (DMPS), alpha lipoic acid (ALA), thiamine tetrahydrofurfuryl disulfide (TTFD), penicillamine, ethylenediaminetetraacetic acid (EDTA), sodium acetate, sodium citrate and citric acid.

Application of the Composition

In preferred embodiments, the glycolipid-based composition is contacted directly with crude oil and/or crude oil fractions containing asphaltene molecules.

In some embodiments, the treatment of crude oil or any hydrocarbon fraction thereof, either during the recovery, transportation, or processing and refining, with an effective amount of the composition, disperses and/or maintains dispersion of asphaltenes, thereby preventing or reducing agglomeration, flocculation, precipitation, and/or the buildup of asphaltic deposits in rock formations and equipment that is designed for storing, handling, pumping, transporting, or refining crude oils or fractions thereof. This treatment may be achieved at temperatures as low as −10° C. up to temperatures exceeding 500° C., or about 1° C. to 400° C.

In some embodiments, the crude oil is heavy crude oil or extra heavy crude oil. "Heavy" crude oil is oil that may comprise highly viscous hydrocarbons such as bitumen, tar, petcoke, asphaltenes and/or asphalt. Heavy oils and extra heavy oils are highly viscous with a density close to or even exceeding water. The phrase "heavy oil" as used herein also includes "extra heavy oil." Heavy hydrocarbons may comprise moderate to high quantities of paraffins, resins and asphaltenes, as well as smaller concentrations of sulfur, oxygen, and nitrogen. Heavy hydrocarbons may also include aromatics or other complex ring hydrocarbons. Additional elements. e.g., metals, may also be present in heavy hydrocarbons in trace amounts.

Heavy oil may be classified by API gravity. Heavy oil generally has an API gravity below about 20° or lower, e.g., about 10-20°, whereas extra heavy oil generally has an API gravity below about 10'. The viscosity of heavy hydrocarbons is generally greater than about 200 cp at reservoir conditions, and that of extra heavy oil is generally about 10,000 cp or more. (For reference, as used herein, "light oil" or "light hydrocarbons" have an API gravity above 20°, preferably above about 25°, even more preferably above 30° to 31°, and a viscosity of about 1 to 100 cp).

In some embodiments, when the subject composition is contacted with the crude oil, it prevents precipitation and/or deposition of asphaltene molecules by acting as an asphaltene inhibitor, an asphaltene dispersant, and/or both.

In certain embodiments, the composition is applied to a subterranean formation, an oil and/or gas well, a wellbore, and/or equipment associated therewith in order to prevent agglomeration, flocculation, precipitation and/or deposition of asphaltenes on such surfaces Thus, in certain embodiments, the methods are useful for preventing precipitation and/or deposition of asphaltenes in the rock pores of subterranean formations, in oil wells, in wellbores, and on equipment, such as, for example, tubing, pipes, drills, tanks, flowlines, rods, pumps, casings, soil, and/or other surfaces or materials associated with all aspects of oil and/or gas production. The subject invention can be used in, for example, vertical, horizontal and/or fracking wells, mature wells, stripper (marginal) wells, offshore wells, in flowlines, to clean near-wellbore zones and to clean storage tanks.

In certain embodiments, the subject invention can be used for improving, enhancing, and/or maintaining oil recovery from and operation of subterranean formations, oil and/or gas wells, boreholes, tubes, pipes, drills, tanks and other structures and equipment involved in oil and/or gas production, transportation, storage and refining.

As used herein, "applying" a composition or product refers to contacting it with a target or site such that the composition or product can have an effect on that target or site. This can be achieved by any means, for example, the compositions can be pumped or injected into oil wells and/or the wellbores, piping, pumps, tanks, etc. associated with oil wells, and/or it can be applied directly to the surfaces of equipment. Application can as a formation squeeze, batch or continuous injection depending upon, for example, the severity of asphaltene precipitation and/or deposition occurring and/or the location of asphaltene precipitation and/or depositions.

As an exemplary embodiment, the composition can be applied in a batch or continuous injection through a capillary line, down the backside of the well annulus, through an umbilical line, or through an umbilical/capillary line combination. In one embodiment, the composition can be applied as a squeeze treatment.

In one embodiment, application of a composition of the subject invention can be performed during drilling operations (e.g., while drilling, while tripping-in or tripping-out of the hole, while circulating mud, while casing, while placing a production liner, and/or while cementing, etc.), and/or as a production treatment (e.g., after oil and/or gas recovery is underway).

Furthermore, the subject invention can be applied during all stages of the chain of operations, including exploration and production operators (e.g., onshore and offshore wellbores, flowlines, formations, and tanks), midstream (e.g., pipelines, tankers, transportation and storage tanks), and in refineries (e.g., heat exchangers, furnaces, distillation towers, cokers, and hydrocrackers).

In some embodiments, the methods are implemented once asphaltene precipitation and/or deposition has begun, and/or after the rate of oil production from a well has begun to decline.

In certain embodiments the composition is applied upstream of the location where asphaltene onset pressure occurs, for example, downhole. In an exemplary embodiment, the composition is injected on a continuous basis through a downhole capillary string or umbilical.

In one exemplary embodiment, the methods comprise applying the composition into the annulus between the tubing and casing, where it can flow through the pump and into the tubing. The treatment can produce effects in less than 24 hours of shut-in time. Preferably, no shut-in time is required.

In another exemplary embodiment, following the application of the composition to a well, the subject treatment can be applied into the annulus between the tubing and casing, where it can then be displaced into the pores of the formation. The volume of treatment used can be determined taking into account, for example, crude oil volume, formation porosity, permeability and thickness.

In some embodiments, brine fluids can be injected into a formation after the subject compositions in order to push the treatment deeper into the formation.

In addition to oil wells and associated equipment, it is often desirable to introduce the composition through perforations in the casing, into the surrounding formation. The composition may be forced into the surrounding formation by applied pressure or, if the composition is allowed to set at the bottom of the casing, the composition may seep into the formation without additional pressure. In specific embodiments, the composition permeates the formation, dissolving blockages in the formation to provide more efficient oil and gas recovery.

In one embodiment, the composition is poured or injected down the casing side (back lines) of a well and allowed to mix with the fluid that is already in the well. When enough fluid is present, the composition can then, optionally, be circulated by, for example, a pump for 24-72 hours, preferably 48-72 hours. Prior to circulating, the composition may be allowed to set for 8 to 24 hours, for example. The setting time, circulating time and dosage depend on, for example, the heaviness of the oil and/or the amount of asphaltene anticipated to be present, as well as the depth and size of the well.

In one embodiment, the composition may be introduced by means of injection pumps into off-shore gas or oil wells to prevent asphaltene flocculation, precipitation and/or deposition in well casings and transmission lines.

Advantageously, the compositions and methods of the subject invention are useful even when applied in the presence of water and/or one or more asphaltene precipitants. Asphaltene precipitants include substances that encourage the flocculation of asphaltenes, such as alkanes including, for example, pentane, heptane, propane, butane, and hexane.

In some embodiments, the methods can utilize compositions that are customized for a particular type of oil, oil well, or equipment Thus, in one embodiment, the method comprises testing the oil, oil well and/or associated equipment, analyzing the asphaltene compositions present therein and determining the preferred formulation for the composition prior to treatment.

In one embodiment, the subject methods can be used alongside and/or to enhance or supplement other methods of asphaltene inhibition and/or dispersal, and/or enhanced oil recovery, e.g., other microbial, mechanical, thermal and/or chemical treatments.

In one embodiment, the subject invention can be used to improve one or more qualities of crude oil. For example, in one embodiment, the methods can be used to reduce the viscosity of heavy asphaltene-containing crude oil, thus allowing for more efficient recovery of the oil from a well.

In some embodiments, the subject compositions and methods can also be useful for enhancing oil recovery due to, for example, the amphiphilic properties of, for example, glycolipid biosurfactants.

In one embodiment, the subject methods can alter the wettability of formation rock so that it is water-wet. Thus, the subject methods can be used to remediate formation "skin damage." Skin damage is an occurrence characterized by a zone of reduced permeability within the vicinity of the wellbore. The reduction in permeability can be a result of, for example, deposits, such as asphaltenes, paraffins, scales and bacterial biofilms, as well as alterations in the wettability of formation rock from water-wet to oil-wet due to, for example, contaminating deposits, oil-based drilling fluids, and the use of BTEX solvents.

The subject treatment can be effective in a range of different geologic formations. For example, the subject invention can be useful in formations as deep as about 7,000 feet or deeper, and as shallow as about 1,500 feet or shallower. Additionally, the invention can be useful in formations having ranges of porosity and/or permeability, for example from about 0.1% to about 20% or more.

In certain embodiments, the subject compositions and methods are used for improving, enhancing, and % or maintaining operation of structures and equipment used for oil and gas production, transmission, storage, transportation, refining and/or processing. Such equipment can include, for example, subterranean oil- and/or gas-bearing formations, wells, well casings, boreholes, tubes, pipes, pumps, drills, tanks, pumps, rods, lines and the like. It is contemplated that the present invention may be used with all such structures and equipment, as well as others related thereto.

In one embodiment, the methods of the subject invention can be used for preventing corrosion associated with rust deposits, which can develop underneath asphaltene deposits. In one embodiment, the methods are used for maintaining storage or transportation tanks that hold crude oil.

In additional embodiments, the composition of the subject invention may be applied directly to equipment. For example, prior to placing rods and casings into gas and/or oil wells, these parts may be sprayed with, or soaked in, the composition. The parts may be dipped into tanks filled with the composition to prevent corrosion and buildup of contaminants.

The composition may be applied with a composition that promotes adherence of the composition to a surface to be treated. The adherence-promoting substance may be a component of the composition or it may be applied simultaneously with, or sequentially with, the composition. Adherence-promoters can include organic or inorganic particles, ions such as calcium, magnesium, phosphate, and sodium, iron, carbon sources that are metabolized to acetyl coenzyme A, acetyl phosphate, and acetate.

Additional Considerations

In certain embodiments, the method comprises applying the composition with one or more further additives. Up to, for example, 50 wt. % or more of further additives may be applied, as needed, for particular applications, such as to vary the VOC levels, increase penetration of the mixture, decrease viscosity of the mixture, and/or as couplers for solvent insolubles in the mixture.

Suitable additives include, but are not limited to, alcohol ethoxylates, ethoxysulfates, C8-C14 alcohol ester blends, glycols, glycol ethers, acid esters, diacid esters, petroleum hydrocarbons, amino acids, alkanolamines, amines, methyl or isobutyl esters of C4-C6 aliphatic dibasic esters and n-methyl-2 pyrolidone.

C8-C14 alcohol ester blends include EXXATE 900, 1000, 1200 from Exxon Chemical; glycols include propylene glycol, dipropylene glycol, and triproplylene glycol; and glycol ethers include dipropylene glycol monomethyl ether, propylene glycol monomethyl ether, propylene glycol-n-butyl ether, ethylene glycol monobutyl ether, and diethylene glycol monobutyl ether. Acid esters include methyl oleate and methyl linoleate, and diacid esters include methyl or butyl diesters of glutaric, adipic, and succinic acids. Petroleum hydrocarbons include AROMATIC 100, AROMATIC 150 ISOPAR M, and ISOPAR K.

Amines such as morpholine; 1,3-dimethyl-2-imidazolidinone; 1, 3-propanediamine; 2-amino-1,3-propanediol; and 3-amino propanol; as well as alkanolamines such as triethanolamine, diethanolamine, 2-aminomethyl propanol, and monoethanolamine act as dispersants for contaminants and solubilize fatty acids and oils. Amino acids, provide nontoxic alternatives to monoethanolamine, and act as metal chelators. Methyl or isobutylesters of C4-C6 aliphatic dibasic esters and n-methyl-2 pyrolidone are also useful.

All additives should have a flash point greater than 100° F., preferably greater than 150° F. and more preferably 195° F. TCC in order to achieve a final product flash point greater than 200° F.

In one embodiment, the subject methods can be used alongside and/or to enhance or supplement other methods of asphaltene inhibition, dispersion, and/or removal, as well as other methods for enhanced oil recovery, e.g., other microbial, mechanical, thermal and/or chemical treatments.

For example, in some embodiments, the methods can comprise applying the glycolipid-based composition alongside an asphaltene dispersant such as, e.g., polyisobutylene succinimide, polyisobutylene succinic ester, nonylphenolformaldehyde resin modified by polyamines, rapeseed oil amide, dodecylbenzene sulfonic acid (DDBSA) and alkyl phenol formaldehyde (PF) resins, and/or other resins.

In some embodiments, the methods can comprise applying the glycolipid-based composition alongside an asphaltene inhibitor such as, e.g., cetyl terimethyl ammonium bromide (CTAB), sodium dodecyl sulfate (SDS), Triton X-100, benzene, benzoic acid, salicylic acid, naphthalene, phthalic acid, nonylphenol, phenanthrene, and/or IR95.

In some embodiments, the methods can comprise applying the glycolipid-based composition alongside a non-biological surfactant.

Surfactants are surface active agents having two functional groups, namely a hydrophilic (water-soluble) or polar group and a hydrophobic (oil-soluble) or non-polar group. The hydrophobic group is usually a long hydrocarbon chain (C8-C18), which may or may not be branched, while the hydrophilic group is formed by moieties such as carboxylates, sulfates, sulfonates (anionic), alcohols, polyoxyethylenated chains (nonionic) and quaternary ammonium salts (cationic).

Non-biological surfactants according to the subject compositions and methods include, but are not limited to: anionic surfactants, ammonium lauryl sulfate, sodium lauryl sulfate (also called SDS, sodium dodecyl sulfate), alkyl-ether sulfates sodium laureth sulfate (also known as sodium lauryl ether sulfate (SLES)), sodium myreth sulfate; docusates, dioctyl sodium sulfosuccinate, perfluorooctanesulfonate (PFOS), perfluorobutanesulfonate, linear alkylbenzene sulfonates (LABs), alkyl-aryl ether phosphates, alkyl ether phosphate; carboxylates, alkyl carboxylates (soaps), sodium stearate, sodium lauroyl sarcosinate, carboxylate-based fluorosurfactants, perfluorononanoate, perfluorooctanoate; cationic surfactants, pH-dependent primary, secondary, or tertiary amines, octenidine dihydrochloride, permanently charged quaternary ammonium cations, alkyltrimethylammonium salts, cetyl trimethylammonium bromide (CTAB) (a.k.a. hexadecyl trimethyl ammonium bromide), cetyl trimethylammonium chloride (CTAC), cetylpyridinium chloride (CPC), benzalkonium chloride (BAC), benzethonium chloride (BZT), 5-Bromo-5-nitro-1,3-dioxane, dimethyldioctadecylammonium chloride, cetrimonium bromide, dioctadecyldi-methylammonium bromide (DODAB); zwitterionic (amphoteric) surfactants, sultaines CHAPS (3-[(3-Cholamidopropyl)dimethylammonio]-1-propanesulfonate), cocamidopropyl hydroxysultaine, betaines, cocamidopropyl betaine, phosphatidylserine, phosphatidylethanolamine, phosphatidylcholine, sphingomyelins; nonionic surfactants, ethoxylate, long chain alcohols, fatty alcohols, cetyl alcohol, stearyl alcohol, cetostearyl alcohol, oleyl alcohol, polyoxyethylene glycol alkyl ethers (Brij): CH3-(CH2)10-16-(O—C2H4)1-25-OH (octaethylene glycol monododecyl ether, pentaethylene glycol monododecyl ether), polyoxypropylene glycol alkyl ethers: CH3-(CH2)10-16-(O—C3H6)1-25-OH, glucoside alkyl ethers: CH3-(CH2)10-16-(O-Glucoside)1-3-OH (decyl glucoside, lauryl glucoside, octyl glucoside), polyoxyethylene glycol octylphenol ethers: C8H17-(C6H4)-(O—C2H4)1-25-OH (Triton X-100), polyoxyethylene glycol alkylphenol ethers: C9H19-(C6H4)-(O—C2H4)1-25-OH (nonoxynol-9), glycerol alkyl esters (glyceryl laurate), polyoxyethylene glycol sorbitan alkyl esters (polysorbate), sorbitan alkyl esters (spans), cocamide MEA, cocamide DEA, dodecyldimethylamine oxide, copolymers of polyethylene glycol and polypropylene glycol (poloxamers), and polyethoxylated tallow amine (POEA).

Anionic surfactants contain anionic functional groups at their head, such as sulfate, sulfonate, phosphate, and carboxylates. Prominent alkyl sulfates include ammonium lauryl sulfate, sodium lauryl sulfate (also called SDS, sodium dodecyl sulfate) and the related alkyl-ether sulfates sodium laureth sulfate, also known as sodium lauryl ether sulfate (SLES), and sodium myreth sulfate. Carboxylates are the most common surfactants and comprise the alkyl carboxylates (soaps), such as sodium stearate.

Surfactants with cationic head groups include: pH-dependent primary, secondary, or tertiary amines; octenidine dihydrochloride; permanently charged quaternary ammonium cations such as alkyltrimethylammonium salts: cetyl trimethylammonium bromide (CTAB) a.k.a. hexadecyl trimethyl ammonium bromide, cetyl trimethylammonium chloride (CTAC); cetylpyridinium chloride (CPC); benzalkonium chloride (BAC); benzethonium chloride (BZT); 5-Bromo-5-nitro-1,3-dioxane; dimethyldioctadecylammonium chloride; cetrimonium bromide; and dioctadecyldi-methylammonium bromide (DODAB).

Zwitterionic (amphoteric) surfactants have both cationic and anionic centers attached to the same molecule. The cationic part is based on primary, secondary, or tertiary amines or quaternary ammonium cations. The anionic part can be more variable and include sulfonates. Zwitterionic surfactants commonly have a phosphate anion with an amine or ammonium, such as is found in the phospholipids phosphatidylserine, phosphatidylethanolamine, phosphatidylcholine, and sphingomyelins.

A surfactant with a non-charged hydrophilic part, e.g. ethoxylate, is non-ionic. Many long chain alcohols exhibit some surfactant properties.

In one embodiment, the subject methods can be utilized alongside and/or in combination with enzyme treatments for asphaltene deposit removal and/or enhanced oil recovery. Enzymes are typically divided into six classes: oxidoreductases, transferases, hydrolases, lyases, isomerases and ligases. Each class is further divided into subclasses and by action. Specific subclasses of enzymes according to the subject invention include, but are not limited to, proteases, amylases, glycosidases, cellulases, glucosidases, glucanases, galactosidases, moannosidases, sucrases, dextranases, hydrolases, methyltransferases, phosphorylases, dehydrogenases (e.g., glucose dehydrogenase, alcohol dehydrogenase), oxygenases (e.g., alkane oxygenases, methane monooxygenases, dioxygenases), hydroxylases (e.g., alkane hydroxylase), esterases, lipases, ligninases, mannanases, oxidases, laccases, tyrosinases, cytochrome P450 enzymes, peroxidases (e.g., chloroperoxidase and other haloperoxidasese), lactases, extracellular enzymes from *Aspergillus* spp. and other microbial species (e.g., lipases from *Bacillus subtilis, B. lichenmformis, B. amyloliquefaciens, Serratia marcescens, Pseudomonas aeruginosa*, and *Staphylococcus aureus*) and other enzyme-based products known in the oil and gas industry.

Other suitable additives include, for example, emulsifying agents, demulsifiers, lubricants, buffering agents, solubility controlling agents, pH adjusting agents, preservatives and, stabilizers.

Suitable buffers include, for example, citrate, gluconate, tartarate, malate, acetate, lactate, oxalate, aspartate, malonate, glucoheptonate, pyruvate, galactarate, glucarate, tartronate, glutamate, glycine, lysine, glutamine, methionine, cysteine, arginine and a mixture thereof. Phosphoric and phosphorous acids or their salts may also be used.

Synthetic buffers are suitable to be used but it is preferable to use natural buffers such as organic and amino acids or their salts listed above.

In a further embodiment, pH adjusting agents include, for example, potassium hydroxide, ammonium hydroxide, potassium carbonate or bicarbonate, hydrochloric acid, nitric acid, sulfuric acid or a mixture.

In one embodiment, additional components can include an aqueous preparation of, for example, sodium bicarbonate or carbonate, sodium sulfate, sodium phosphate, and/or sodium biphosphate.

Production of Microbe-Based Products

In one embodiment, the subject invention provides methods of producing a microbial metabolite by cultivating a microbe under conditions appropriate for growth and production of the metabolite; and, optionally, purifying the metabolite. In a specific embodiment, the metabolite is a biosurfactant. The metabolite may also be, for example, ethanol, lactic acid, beta-glucan, proteins, amino acids, peptides, metabolic intermediates, polyunsaturated fatty acids, and lipids. The metabolite content produced by the method can be, for example, at least 20%, 30%, 40%, 50%, 60%, 70%, 80%, or 90%.

In preferred embodiments, the methods of the subject invention comprise cultivating a sophorolipid-producing yeast in a submerged fermentation reactor to produce a yeast culture, said yeast culture comprising liquid fermentation broth, yeast cells and a mixture of hydrophobic and hydrophilic SLP; separating the hydrophobic and hydrophilic SLP from one another; and purifying the hydrophobic and hydrophilic SLP.

In most cases, fermentation of SLP results in a mixture of hydrophobic (water-insoluble) SLP, including, e.g., LSL, mono-acetylated ASL and di-acetylated ASL, and hydrophilic (water-soluble) SLP, including, e.g., non-acetylated ASL.

Due to the structure and composition of SLP, these biosurfactants have excellent surface and interfacial tension reduction properties, as well as other beneficial biochemical properties, which can be useful as a replacement for chemical surfactants in applications such as large scale industrial and agriculture uses, cosmetics, household products, health, medical and pharmaceutical fields, and oil and gas recovery.

In preferred embodiments, the subject invention provides methods of producing sophorolipidic compositions by cultivating a sophorolipid-producing yeast using submerged fermentation. The methods can be scaled up or down in size. Most notably, the methods can be scaled to an industrial scale, i.e., a scale that is suitable for use in supplying biosurfactants in amounts to meet the demand for commercial applications, for example, production of compositions for agriculture and enhanced oil recovery.

The microorganisms utilized according to the subject invention may be natural, or genetically modified microorganisms. For example, the microorganisms may be transformed with specific genes to exhibit specific characteristics. The microorganisms may also be mutants of a desired strain. As used herein, "mutant" means a strain, genetic variant or subtype of a reference microorganism, wherein the mutant has one or more genetic variations (e.g., a point mutation, missense mutation, nonsense mutation, deletion, duplication, frameshift mutation or repeat expansion) as compared to the reference microorganism. Procedures for making mutants are well known in the microbiological art. For example, UV mutagenesis and nitrosoguanidine are used extensively toward this end.

In preferred embodiments, the microorganism is any yeast or fungus. Examples of yeast and fungus species suitable for use according to the current invention, include, but are not limited to, *Acaulospora, Aspergillus, Aureobasidium* (e.g., *A. pullulans*), *Blakeslea, Candida* (e.g., *C. albicans, C. apicola*), *Cryptococcus, Debaryomyces* (e.g., *D. hansenii*), *Entomophthora, Fusarium, Hanseniaspora* (e.g., *H. uvarum*), *Hansenula, Issatchenkia, Kluyveromyces, Mortierella, Mucor* (e.g., *M. piriformis*), *Meyerozyma* (e.g., *M. guilliermondii*), *Penicillium, Phythium, Phycomyces, Pichia* (e.g., *P. anomala, P. guilliermondii, P. occidentalis, P. kudriavzevii*), *Pseudozyma* (e.g., *P. aphidis*), *Rhizopus, Saccharomyces* (*S. cerevisiae, S. boulardii sequela, S. torula*), *Starmerella* (e.g., *S. bombicola*), *Torulopsis, Thraustochytrium, Trichoderma* (e.g., *T. reesei, T. harzianum, T. virens*), *Ustilago* (e.g., *U. maydis*), *Wickerhamomyces* (e.g., *W. anomalus*), *Wiliopsis*, and *Zygosaccharomyces* (e.g., *Z. bailli*).

In preferred embodiments, microorganism is a *Starmerella* spp. yeast and/or *Candida* spp. yeast, e.g., *Starmerella (Candida) bombicola, Candida apicola, Candida batistae, Candida floricola, Candida riodocensis, Candida stellate* and/or *Candida kuoi*. In a specific embodiment, the microorganism is *Starmerella bombicola*, e.g., strain ATCC 22214.

In one embodiment, the method comprises filling a fermentation reactor with a liquid nutrient medium; inoculating the reactor with a sophorolipid-producing yeast to produce a yeast culture; and cultivating the yeast culture under conditions favorable for production of SLP.

The microbe growth vessel used according to the subject invention can be any fermenter or cultivation reactor for industrial use. In one embodiment, the vessel may have functional controls/sensors or may be connected to functional controls/sensors to measure important factors in the cultivation process, such as pH, oxygen, pressure, temperature, agitator shaft power, humidity, viscosity and/or microbial density and/or metabolite concentration.

In a further embodiment, the vessel may also be able to monitor the growth of microorganisms inside the vessel (e.g., measurement of cell number and growth phases). Alternatively, samples may be taken from the vessel for enumeration, purity measurements, SLP concentration, and/or visible oil level monitoring. For example, in one embodiment, sampling can occur every 24 hours.

The microbial inoculant according to the subject methods preferably comprises cells and/or propagules of the desired microorganism, which can be prepared using any known fermentation method. The inoculant can be pre-mixed with water and/or a liquid growth medium, if desired.

In certain embodiments, the cultivation method utilizes submerged fermentation in a liquid growth medium. In one embodiment, the liquid growth medium comprises a carbon source. The carbon source can be a carbohydrate, such as glucose, dextrose, sucrose, lactose, fructose, trehalose, mannose, mannitol, and/or maltose; organic acids such as acetic acid, fumaric acid, citric acid, propionic acid, malic acid, malonic acid, and/or pyruvic acid; alcohols such as ethanol, propanol, butanol, pentanol, hexanol, isobutanol, and/or glycerol; fats and oils such as canola oil, soybean oil, rice bran oil, olive oil, corn oil, sunflower oil, sesame oil, and/or linseed oil; powdered molasses, etc. These carbon sources may be used independently or in a combination of two or more. In preferred embodiments, a hydrophilic carbon source, e.g., glucose, and a hydrophobic carbon source, e.g., oil or fatty acids, are used.

In some embodiments, the cultivation method utilizes reduced amounts of a carbon source, compared with standard methods in the art. For example, in some embodiments, the liquid growth medium can comprise a sugar (e.g., glucose) and an oil (e.g., canola oil) at amounts of 25-70 g/L and 25-70 ml/L, respectively. Advantageously, in some embodiments, reducing the amount of sugar and oil in the liquid growth medium reduces the amount of glucose and/or oil impurities left in the culture, thus enhancing the ability to purify the SLP molecules to greater degrees of purity.

In one embodiment, the liquid growth medium comprises a nitrogen source. The nitrogen source can be, for example, yeast extract, potassium nitrate, ammonium nitrate, ammonium sulfate, ammonium phosphate, ammonia, urea, and/or ammonium chloride. These nitrogen sources may be used independently or in a combination of two or more.

In one embodiment, one or more inorganic salts may also be included in the liquid growth medium. Inorganic salts can include, for example, potassium dihydrogen phosphate, monopotassium phosphate, dipotassium hydrogen phosphate, disodium hydrogen phosphate, potassium chloride, magnesium sulfate, magnesium chloride, iron sulfate, iron chloride, manganese sulfate, manganese chloride, zinc sulfate, lead chloride, copper sulfate, calcium chloride, calcium carbonate, calcium nitrate, magnesium sulfate, sodium phosphate, sodium chloride, and/or sodium carbonate. These inorganic salts may be used independently or in a combination of two or more.

In one embodiment, growth factors and trace nutrients for microorganisms are included in the medium. This is particularly preferred when growing microbes that are incapable of producing all of the vitamins they require. Inorganic nutrients, including trace elements such as iron, zinc, copper, manganese, molybdenum and/or cobalt may also be included in the medium. Furthermore, sources of vitamins, essential amino acids, proteins and microelements can be included, for example, corn flour, peptone, yeast extract, potato extract, beef extract, soybean extract, banana peel extract, and the like, or in purified forms. Amino acids such as, for example, those useful for biosynthesis of proteins, can also be included.

The method of cultivation can further provide oxygenation to the growing culture. One embodiment utilizes slow motion of air to remove low-oxygen containing air and introduce oxygenated air. The oxygenated air may be ambient air supplemented daily through mechanisms including impellers for mechanical agitation of the liquid, and air spargers for supplying bubbles of gas to the liquid for dissolution of oxygen into the liquid. In certain embodiments, dissolved oxygen (DO) levels are maintained at about 25% to about 75%, about 30% to about 70%, about 35% to about 65%, about 40% to about 60%, or about 50% of air saturation.

In some embodiments, the method for cultivation may further comprise adding additional acids and/or antimicrobials in the liquid medium before and/or during the cultivation process. Antimicrobial agents or antibiotics (e.g., streptomycin, oxytetracycline) are used for protecting the culture against contamination. In some embodiments, however, the metabolites produced by the yeast culture provide sufficient antimicrobial effects to prevent contamination of the culture.

In one embodiment, prior to inoculation, the components of the liquid culture medium can optionally be sterilized. In one embodiment, sterilization of the liquid growth medium can be achieved by placing the components of the liquid culture medium in water at a temperature of about 85-100° C. In one embodiment, sterilization can be achieved by dissolving the components in 1 to 3% hydrogen peroxide in a ratio of 1:3 (w/v).

In one embodiment, the equipment used for cultivation is sterile. The cultivation equipment such as the reactor/vessel may be separated from, but connected to, a sterilizing unit, e.g., an autoclave. The cultivation equipment may also have a sterilizing unit that sterilizes in situ before starting the inoculation. Gaskets, openings, tubing and other equipment parts can be sprayed with, for example, isopropyl alcohol. Air can be sterilized by methods know in the art. For example, the ambient air can pass through at least one filter before being introduced into the vessel. In other embodiments, the medium may be pasteurized or, optionally, no heat at all added, where the use of pH and/or low water activity may be exploited to control unwanted microbial growth.

The pH of the culture should be suitable for the microorganism of interest. In some embodiments, the pH is about 2.0 to about 7.0, about 3.0 to about 5.5, about 3.25 to about 4.0, or about 3.5. Buffers, and pH regulators, such as carbonates and phosphates, may be used to stabilize pH near a preferred value. In certain embodiments, a base solution is used to adjust the pH of the culture to a favorable level, for example, a 15% to 30%, or a 20% to 25% NaOH solution. The base solution can be included in the growth medium and/or it can be fed into the fermentation reactor during cultivation to adjust the pH as needed.

In one embodiment, the method of cultivation is carried out at about 5° to about 100° C., about 15° to about 60° C., about 200 to about 45° C., about 22 to about 35° C., or about 24° to about 28° C. In one embodiment, the cultivation may be carried out continuously at a constant temperature. In another embodiment, the cultivation may be subject to changing temperatures.

According to the subject methods, the microorganisms can be incubated in the fermentation system for a time period sufficient to achieve a desired effect, e.g., production of a desired amount of cell biomass or a desired amount of one or more microbial growth by-products. The microbial growth by-product(s) produced by microorganisms may be retained in the microorganisms and/or secreted into the growth medium. The biomass content may be, for example from 5 g/l to 180 g/l or more, or from 10 g/l to 150 g/l.

In certain embodiments, fermentation of the yeast culture occurs for about 100 to 150 hours, or about 115 to about 125 hours, or about 120 hours. In some embodiments, the fermentation cycle is ended once the glucose and/or oil concentrations in the medium are exhausted (e.g., at a level of 0% to 0.5%). In some embodiments, the end of the fermentation cycle is determined to be a time point when the microorganisms have begun to consume trace amounts of SLP.

According to the subject methods, the hydrophilic and hydrophobic SLP of the SLP mixture are separated after the submerged fermentation cycle is complete. In this step, the entire yeast culture is left to sit undisturbed for 10 to 50 hours, either in the fermentation reactor, or after being collected into a separate, first collection container. In preferred embodiments, an "undisturbed" culture is one that is not altered or interfered with physically or chemically. For example, an undisturbed culture is one that is resting, rather than being subjected to moving, mixing, or addition or removal of components.

A layer of hydrophobic SLP, the majority of which comprises LSL with trace amounts of hydrophobic di-acetylated and/or mono-acetylated ASL (e.g., approximately 10:1 to 4:1, LSL to ASL), will settle at the bottom of the sitting culture. The settled hydrophobic SLP layer is collected into a second collection container, and a supernatant, which comprises dissolved hydrophilic SLP (e.g., non-acetylated ASL) as well as cells, broth components, and dissolved glucose, is leftover. In certain embodiments, the hydrophobic SLP layer comprises about 75% to 85%, or about 80% of the total SLP produced in the yeast culture.

In preferred embodiments, the both the hydrophobic and hydrophilic linear SLP are purified for use according to the subject invention.

EXAMPLES

A greater understanding of the present invention and of its many advantages may be had from the following examples, given by way of illustration. The following examples are illustrative of some of the methods, applications, embodiments and variants of the present invention. They are not to be considered as limiting the invention. Numerous changes and modifications can be made with respect to the invention.

Example 1—Cultivation of *Starmerella Bombicola* for SLP Production and Purification of SLP Preparation A stainless steel fermentation reactor is used for the production of SLP. The reactor comprises about 150 gallons of water, into which a medium comprising dextrose (25 to 150 g/L), yeast extract (1 to 10 g/L), canola oil (25 ml/L to 110 ml/L) and urea (0.5 to 5 g/L) is added.

The reactor comprises a mixing apparatus for continuous agitation and mixing of the culture. The reactor with medium is steamed at 100° C. for about 60 minutes in order to sterilize the reactor and the growth medium.

The reactor is then allowed to cool down. Once the reactor reaches about 35° C., antibiotics are added to the medium to prevent bacterial contamination. The antibiotic composition comprises 300 g streptomycin and 20 g oxytetracycline dissolved in 4 L DI water. Other reactor tubing and openings are sprayed with isopropyl alcohol (IPA) to sterilize them.

Small-scale reactors are used for growing *Starmerella bombicola* inoculum cultures. The culture is grown for at least 42 to 48 hours at 26 to 28° C. in the small-scale reactors.

Once the stainless-steel fermentation reactor reaches 30° C., it is then inoculated with about 25 L of the inoculum culture.

Fermentation

The temperature of fermentation is held at 23 to 28° C. After about 22 to 26 hours, the pH of the culture is set to about 3.0 to 4.0, or about 3.5, using 20% NaOH. The fermentation reactor comprises a computer that monitors the pH and controls the pump used to administer the base, so that the pH remains at 3.5.

After about 6-7 days of cultivation (120 hours+/−1 hour), if 7.5 ml of a SLP layer is visible with no oil visible and no glucose detected (e.g., about 0% to 0.5%), the batch is ready for harvesting.

Harvesting

The culture is harvested to a first collection container and left undisturbed for 24 to 48 hours. A layer of hydrophobic SLP settles to the bottom of the first collection container.

Example 2—Water Washing for Purification of Lipophilic SLP Molecules

The settled hydrophobic SLP layer, containing approximately 60-70% LSL and 30-40% hydrophobic ASL, is harvested to a second collection container, leaving behind a supernatant. DI water is mixed with the SLP layer at a ratio of 4:1 to 3:1, SLP to water (volume). The mixture is warmed to a temperature of about 60° C. to 70° C. and mixed for 1 to 2 hours.

Mixing is halted and the mixture is allowed to rest for 8 to 24 hours, or until the temperature of the mixture lowers naturally to about 25° C. to 35° C. The mixture forms three layers: a bottom layer comprising hydrophobic SLP and water; a middle layer comprising water and impurities, such as yeast cells, glucose, and fatty acids; and a top layer comprising impurities in foam.

The bottom hydrophobic SLP-water layer is drained from the second container into a third container, and the water content is adjusted so that it is below 50% but above about 10% to 15% by volume. Ideally, the water content is about 20% by volume.

The water content can be reduced via evaporation, using either a cyclone evaporator or a spray dryer at 60° C. The water content can be increased by adding purified water and mixing it with the SLP for about 1 to 2 hours at 70° C.

The purified product, the water-washed SLP composition, has an HLB of about 1 to 8, with the SLP portion comprising about 80 to 90% hydrophobic SLP molecules, such as LSL, and di-acetylated and/or mono-acetylated ASL.

The middle and top layers can be subjected to water washing again to recover additional hydrophobic SLP.

Example 3—Removal of Residual Oleic Acid from Hydrophobic SLP

To obtain a low HLB hydrophobic SLP composition with a low oil impurities content, the water-washed SLP composition is further purified through the addition of canola oil. The oil is added to the water-washed SLP composition at a ratio of 1:2 (added oil:SLP), 2:1, 5:1, or 10:1.

Then, the water-washed SLP composition and oil is mixed for 2 hours, or about 1 to 2.5 hours at a temperature of 60° C. After mixing, the entire composition is left to sit undisturbed overnight (or about 16 hours) to stratify the hydrophobic SLP and water layer from the added oil layer, which now contains oil and fatty acid and/or oil impurities.

After the stratification of the layers, the oil layer can be removed to obtain a hydrophobic SLP product with greater purity.

As illustrated in Tables 1 and 2, the majority of fatty acids in the water-washed SLP compositions can be removed. Furthermore, as illustrated in Table 1, the addition of canola oil at a ratio of 10:1 (canola oil:SLP) removes 98% of the fatty acids from the SLP composition. This is a significant decrease of the fatty acid concentration, leaving a purified SLP composition with a fatty acid concentration of 0.480/a, compared to the 23.54% fatty acid concentration of the water-washed SLP composition.

TABLE 1

Fatty acid content in SLP composition after oil purification of SLP (23.53% Fatty acids initially)

| Ratio of canola oil to SLP | Fatty acid concentration after oil purification |
| --- | --- |
| 1:2 | 9.5% |
| 2:1 | 4.46% |
| 5:1 | 2.51% |
| 10:1 | 0.48% |

TABLE 2

Fatty acid content in SLP composition after oil purification of SLP (19.62% Fatty acids initially)

| Ratio of canola oil to SLP | Fatty acid concentration after oil purification |
|---|---|
| 5:1 | 2.17% |

Table 3 illustrates that the composition purified with the canola oil has a lower CMC compared to the water-washed SLP composition.

TABLE 3

CMC of SLP composition

| Sample | CMC |
|---|---|
| Water washed SLP | 113 |
| Water washed SLP treated with canola oil | 57 |

Example 4—Obtaining Linear SLP from Lactonic SLP

During the water-washing purification method, lactonic SLP, whether purified or still present in the bottom hydrophobic SLP layer of the stratified SLP-water mixture, can be mixed with a base to adjust the pH to, e.g., about 4 to 7, or about 4.2 to 6.8. In certain embodiments, this is achieved by titrating small amounts (e.g., 0.1 µl to 10 ml per titration) of NaOH or another base into the mixture, wherein the increased pH causes hydrolysis of the LSL ester bond, converting the lactonic molecule to a purified linear SLP.

Example 5—Purification of Hydrophilic SLP

To obtain hydrophilic SLP from the yeast culture produced according to Example 1, supra, the supernatant, comprising dissolved hydrophilic SLP (e.g., non-acetylated ASL), cells, and broth components, such as glucose, can be centrifuged to remove cellular matter and then the supernatant is subjected to yeast digestion and/or enzymatic digestion to remove glucose impurities.

Yeast Digestion

The supernatant is placed into a container with aeration capabilities. Additional live yeast cells, such as *S. bombicola*, are introduced into the supernatant, which is then aerated for 12 to 48 hours. The *S. bombicola* consume residual glucose within the supernatant and will produce small amounts of SLP. Then, the supernatant-culture is centrifuged to produce a pellet comprising residual cells and a second supernatant that comprises the glucose-free hydrophilic SLP in liquid.

The second supernatant is evaporated to adjust the water content to, preferably, 20% to 30%. The resulting product will have an HLB of 10 or above, and in comparison to the initial supernatant, will have zero, or insignificant amounts of, glucose.

Enzymatic Digestion of Glucose Impurities

Glucose oxidase (GOx) enzyme is added to the supernatant after centrifugation. GOx catalyzes the conversion of glucose to gluconic acid and hydrogen peroxide. Hydrogen peroxide can be either evaporated or left in the product to, for example, increase its antibacterial activity. Digestion of glucose in this manner results in higher purity hydrophilic SLP.

Example 6—Comparison Study for Asphlatene Prevention

Asphaltenes were extracted from heavy oil and their solubility and stability were evaluated at different concentrations of n-heptane and water.

n-heptane was chosen to be the precipitant agent, resulting in asphaltenes that corresponded to 10% w/w of the crude oil. The FTIR analyses indicated the presence of condensed aromatic hydrocarbon (1602.2 $cm^{-1}$, 869.9 $cm^{-1}$, 814.2 $cm^{-1}$, 750.5 $cm^{-1}$) and an intense peak (1037 $cm^{-1}$) related to sulfoxide groups (Hassan, Moamen, Zaher, 2020, Imanbayev et al., 2017).

n-heptane from Alfa Aesar (95%), 4-dodecylbezenesulfonic acid (DBSA) from Aldrich Chemistry (≥95%), and a crude oil with API gravity of 19.2° were used in the laboratory testing.

Asphaltenes were precipitated from the crude oil using n-heptane (C7) (oil/C7 ratio 1:10), extracted via a 0.45 µm filter and characterized using Fourier Transform Infrared Spectroscopy (FTIR).

Linear Sophorolipids (SLP-L) isolated and purified to 92% activity from a large-scale fermentation process were used after dilution in DI water. LC-MS analysis revealed the sample comprised mainly of acetylated and non-acetylated linear SLP derived from stearic, oleic and linoleic fatty acids.

The solubility of asphaltenes was evaluated by the Accelerated Solubility Test-AST (Aguiar et al., 2019) at 25° C., 300 RPM for 10 minutes. Different ratios of n-heptane/xylenes were tested: 90, 80, 70, 60, 50, and 40% V/V of n-heptane and the final concentration of asphaltenes was 0.5% w/V. Based on the noted solubility behavior, a concentration of 60% n-heptane was chosen for testing.

The effect of water addition was evaluated by adding 5,000, 7,500 and 10,000 ppm of water to the test cells containing a 60% V/V n-heptane to xylene solution of asphaltenes (0.5%). SLP and DBSA were evaluated as asphaltene dispersants at different concentrations as described in Table 4.

TABLE 4

| Testing Conditions | | | |
|---|---|---|---|
| Parameters | SLP | DBSA (1) | DBSA (2) |
| n-Heptane (% V/V) | 60 | 60 | 60 |
| Asphaltenes concentration (% w/V) | 0.5 | 0.5 | 0.5 |
| Water added (ppm) | 5,000 | 5,000 | — |
| Test conditions | 300 RPM, 10 minutes and 25° C. | 300 RPM, 10 minutes and 25° C. | 300 RPM, 10 minutes and 25° C. |
| Chemical dosage (ppm) | 1000, 750, 400 and 200 ppm | 1000, 500 and 250 ppm | 1000, 500 and 250 ppm |

Results

Sophorolipids were able to effectively inhibit 100% of the asphaltene precipitation when applied at 750 ppm and demonstrated an efficiency of 70% at 400 ppm in the system with 60% of n-heptane and 5,000 ppm of water. Under the same conditions, a commonly-used chemical surfactant, dodecylbenzenesulfonic acid (DBSA), showed no impact on asphaltene inhibition with and without water at concentrations less than 1000 ppm.

Figure 2:
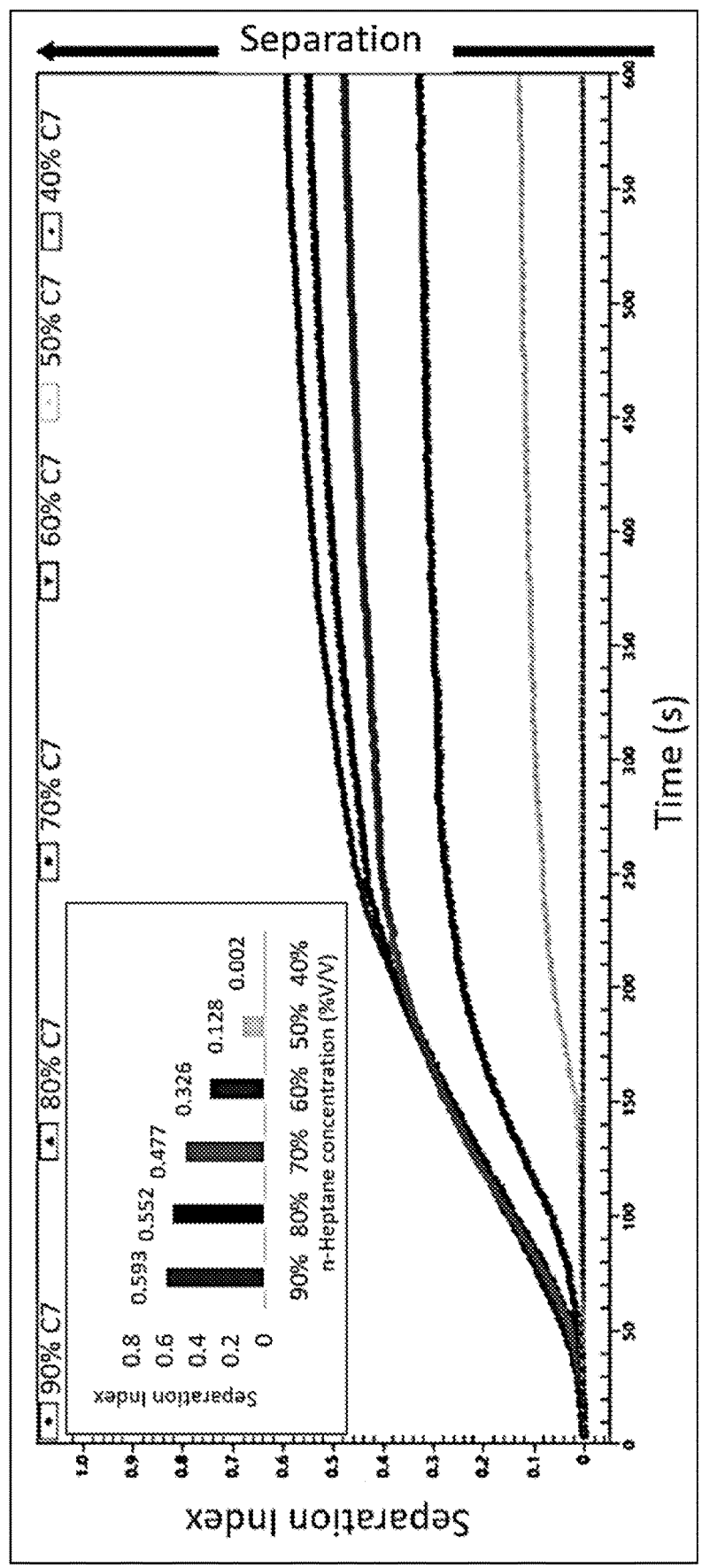
FIG. 2 shows the Separation Index of AST for asphaltenes using different concentrations of n-heptane (90, 80, 70, 60, 50, 40% V/V).

FIGS. 1 and 2 show that asphaltenes were stable at 40% V/V n-heptane. The asphaltenes started to precipitate with 50% V/V n-heptane and precipitation increased upon increasing n-heptane ratio. The precipitation kinetics were similar for 90, 80 and 70% V/V n-heptane but were slower for 60% and 50% V/V.

The precipitant concentration selected for the performance screening tests was 60% V/V n-heptane. This was based on the principle that the lower the amount of precipitant, the higher the polarity of the asphaltenes are that precipitate. The asphaltenes that precipitate in wells during production are more polar than the ones precipitated from crude oil using high concentrations of n-heptane, so to better simulate the conditions of the well, the performance screening was conducted using a lower concentration of the precipitant.

The influence of water on asphaltene stability was also evaluated at various concentrations. Water is present in almost all hydrocarbon reservoirs and oil is produced at water cuts varying from 0 to 95%. Water can interact with asphaltene molecules by hydrogen bonding and may influence the asphaltene aggregation mechanism.

Figure 3:
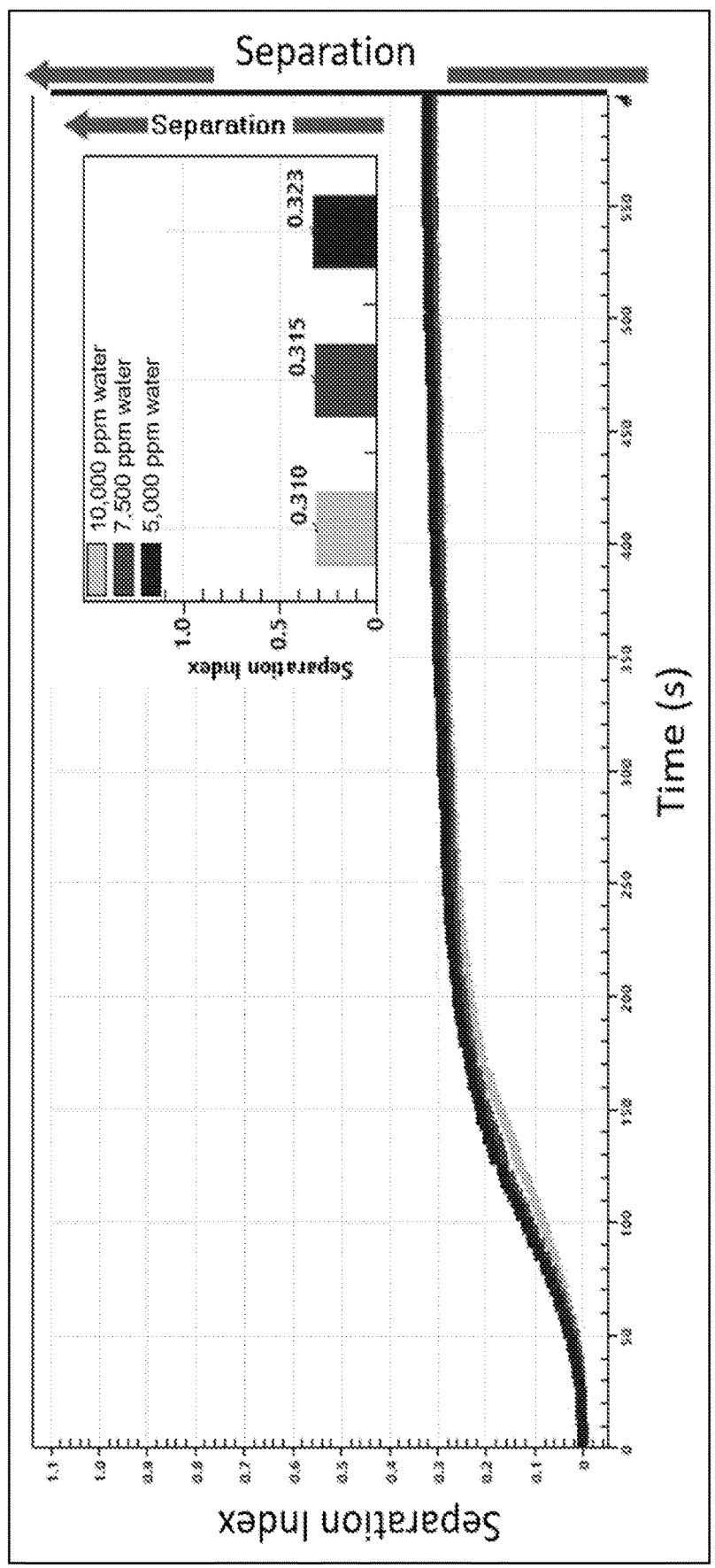
FIG. 3 shows the effect of water on Separation Index for AST for asphaltenes at 0.5% w/V n-heptane at 60% V/V.

In this study, the addition of water at concentrations of 5,000 ppm to 10,000 ppm did not change the precipitation behavior with 60% V/V of n-heptane (FIG. 3). Assuming that water does not affect the asphaltene precipitation behavior, any effects noted after adding a surfactant solution in water were only attributable to the surfactant applied.

Figure 4A:
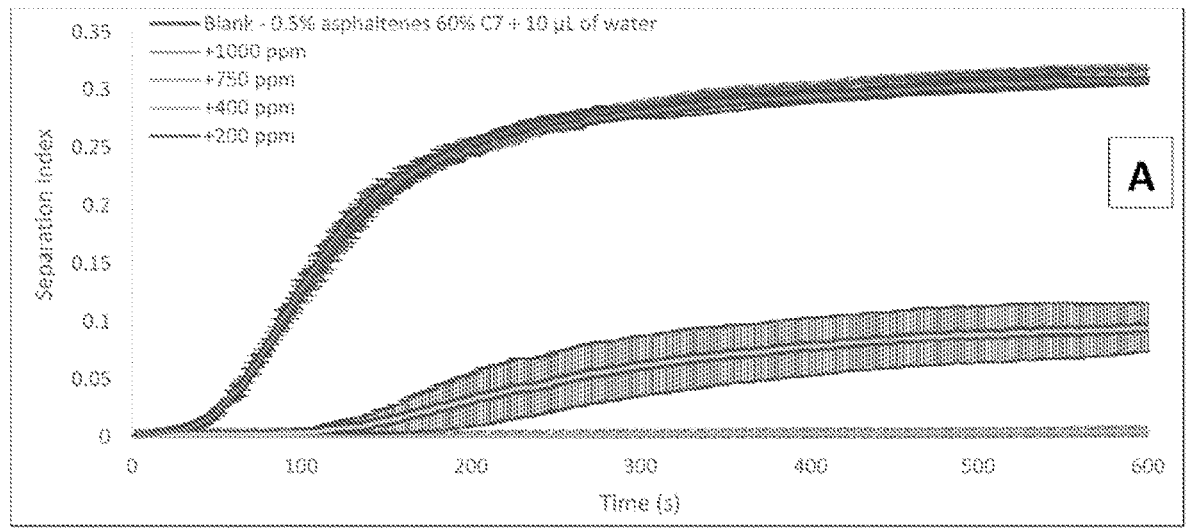
FIGS. 4A-4B show the effect of linear SLP at different concentrations on AST for asphaltenes at 0.5% w/V, n-heptane at 60% V/V and water at 5,000 ppm: Separation Index over time (A), Separation Index Average (B).
Figure 4B:
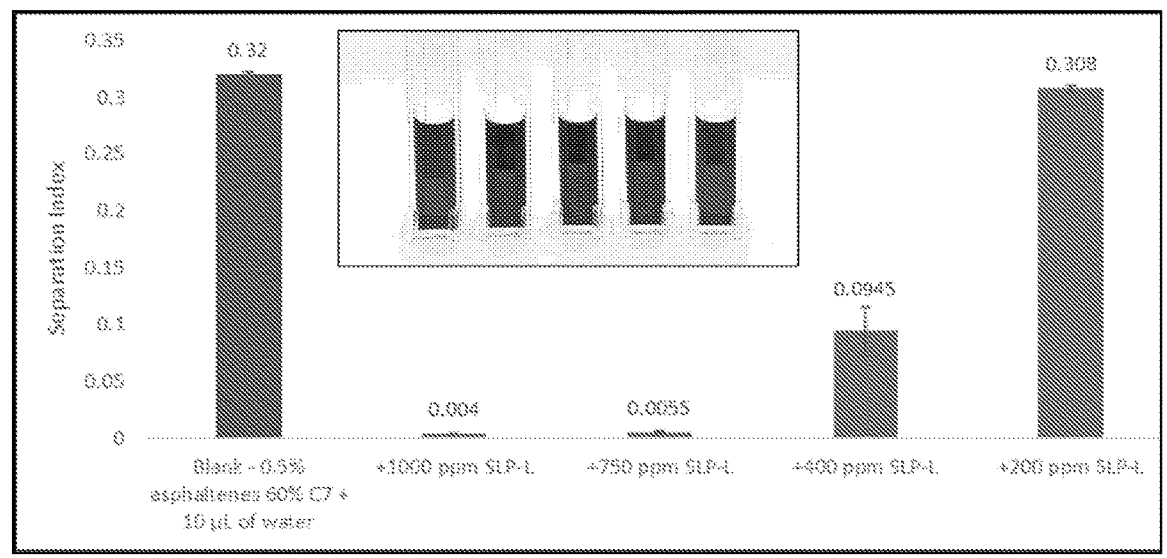

As shown in FIGS. 4A-4B, the use of 1000 and 750 ppm of SLP was able to prevent the precipitation of asphaltenes, while 400 ppm had an inhibition efficiency of 70% (based on the Separation Index). For these conditions and this sample of asphaltenes, SLP did not perform at 200 ppm dosage.

Figure 5A:
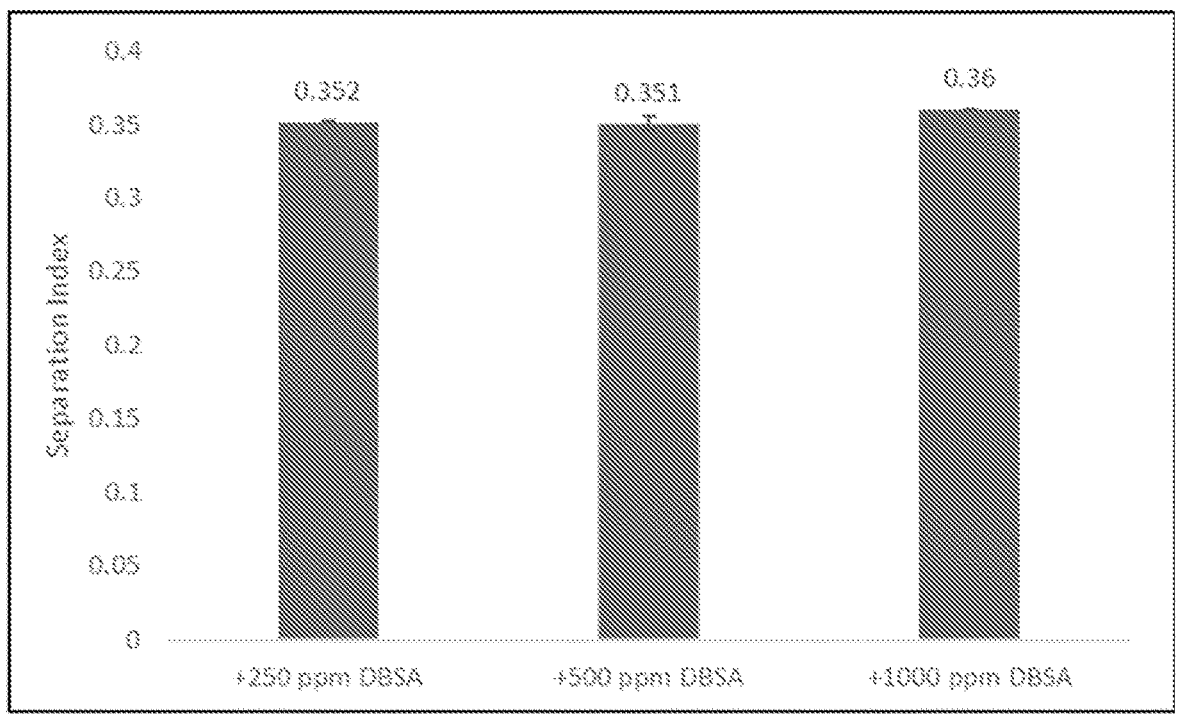
FIGS. 5A-5B show the effect of DBSA on AST asphaltenes at 0.5% w/V, n-heptane at 60% V/V with water at 5,000 ppm (A) and without water (B).
Figure 5B:
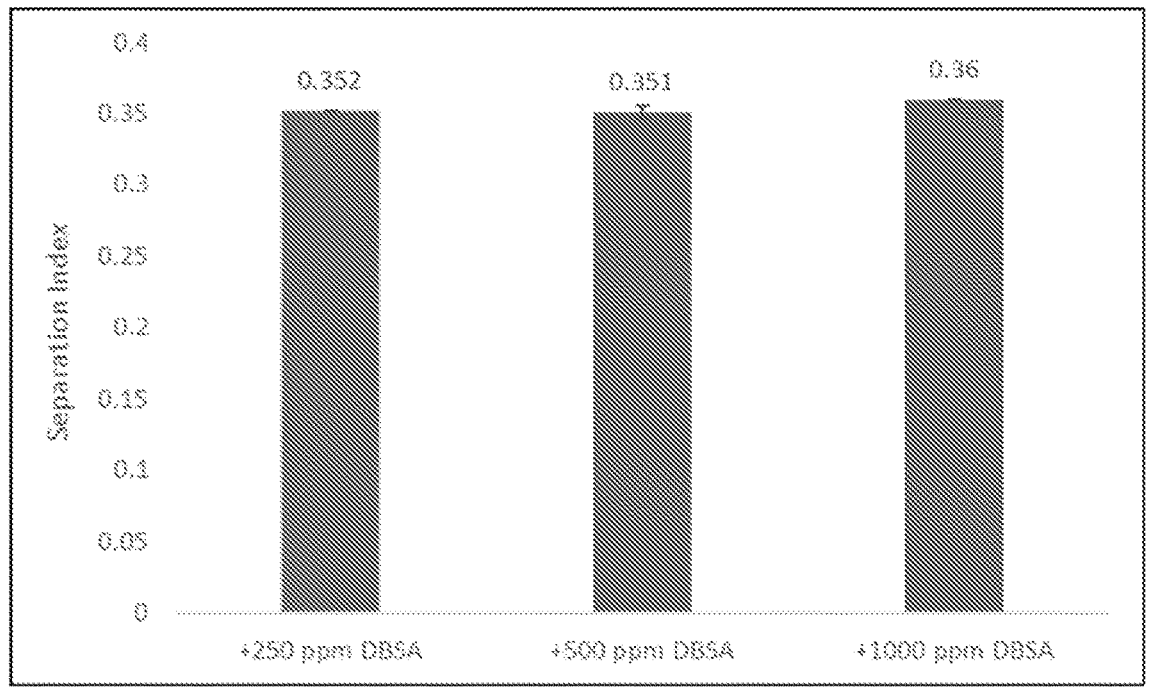

In order to compare the efficiency of SLP with commercially used surfactants, DBSA was tested at the same conditions used for SLP (FIG. 5A). Even at the highest concentration tested (1250 ppm), DBSA was unable to effectively inhibit asphaltene precipitation. This behavior is associated with changes in the electrostatic interactions between DBSA-asphaltenes when water is added. As DBSA is not typically recommended for use under these conditions, we evaluated the efficiency of DBSA without the presence of water (FIG. 5B) and confirmed no inhibition was observed even at the highest concentrations tested (1000 ppm).

Figure 6:
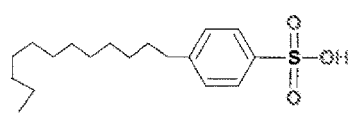
FIG. 6 shows molecular drawings of DBSA and linear SLP, demonstrating diversity and complexity of the microbial surfactant versus chemical surfactant.
Figure 6:
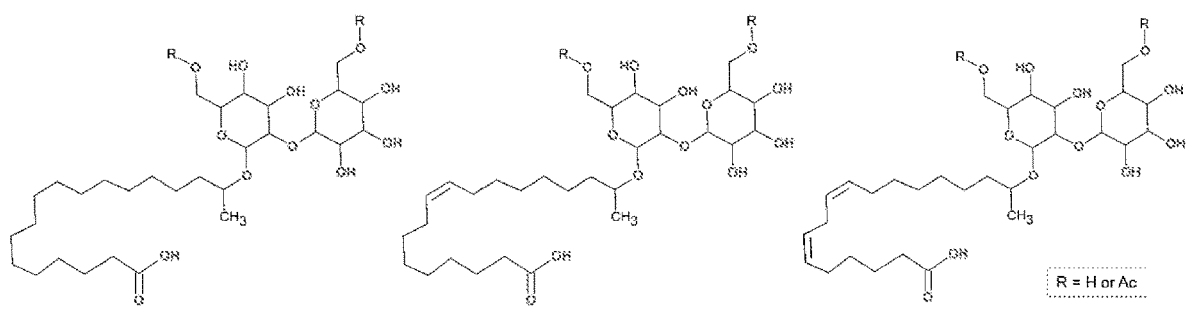

FIG. 6 presents molecular drawings of DBSA and linear SLP. The linear SLP was comprised of three main species of acetylated and non-acetylated head groups and stearic, oleic and linoleic fatty acid tail groups

REFERENCES

Akbarzadeh, K., Hammami, A., Kharrat, A., Zhang, D., Allenson, S., Creek, J., . . . & Mullins, O. C. (2007). Asphaltenes-problematic but rich in potential. *Oilfield Review*, 19(2), 22-43.

Aguiar, J. I. S., Pimentel Porto Mazzeo, C., Garan, R., Punase, A., Razavi, S., & Mahmoudkhani, A. (2019, March). What Can We Learn from Analysis of Field Asphaltenes Deposits? Enhancing Product Development Through Knowledge-Based Field-to-Lab-to-Field Approach. In *SPE International Conference on Oilfield Chemistry*. Society of Petroleum Engineers. https://doi.org/10.2118/193604-MS Aguiar, J. I. S., Garreto, M. S., Gonzalez, G., Lucas, E. F., & Mansur, C. R. (2014). Microcalorimetry as a new technique for experimental study of solubility parameters of crude oil and asphaltenes. *Energy & fuels*, 28(1), 409-416. https://doi.org/10.1021/ef4010576

Aguiar, J. I. S., Moreno, M. M., Mansur, C. R. E. (2013, November). Application of Natural Products As Dispersants/Flocculation Of Asphaltenes. In 13 AICHE Annual Meeting.

Andersen, S. I., Del Rio, J. M., Khvostitchenko, D., Shakir, S., & Lira-Galeana, C. (2001). Interaction and solubilization of water by petroleum asphaltenes in organic solution. *Langmuir*, 17(2), 307-313. https://doi.org/10.1021/la000871m Arab, F., & Mulligan, C. N. (2016). Efficiency of sophorolipids for arsenic removal from mine tailings. *Environmental Geotechnics*. https://doi.org/10.1680/jenge.15.00016

Ashby, R. D., Solaiman, D. K., Fan, X., & Olanya, M. (2018). Antimicrobial Potential of Sophorolipids for Anti-Acne, Anti-Dental Caries, Hide Preservation, and Food Safety Applications. In *Natural and Bio-Based Antimicrobials for Food Applications* (pp. 193-208). American Chemical Society. 10.1021/bk-2018-1287.ch010

Aslan, S., & Firoozabadi, A. (2014). Effect of water on deposition, aggregate size, and viscosity of asphaltenes. *Langmuir*, 30(13), 3658-3664. https://doi.org/10.1021/la404064t Atta, A. M., Ezzat, A. O., Abdullah, M. M., & Hashem, A. I. (2017). Effect of different families of hydrophobic anions of imadazolium ionic liquids on asphaltene dispersants in heavy crude oil. *Energy & Fuels*, 31(8), 8045-8053. https://doi.org/10.1021/acs.energyfuels.7b01167

Bognolo, G. (1999). Biosurfactants as emulsifying agents for hydrocarbons. *Colloids and Surfaces A: Physicochemical and Engineering Aspects*, 152(1-2), 41-52. https://doi.org/10.1016/S0927-7757(98)00684-0

Borton, D., Pinkston, D. S., Hurt, M. R., Tan, X., Azyat, K., Scherer, A., . . . & Kenttdmaa, H. I. (2010). Molecular structures of asphaltenes based on the dissociation reactions of their ions in mass spectrometry. *Energy & Fuels*, 24(10), 5548-5559. https://doi.org/10.1021/ef1007819

Câmara, J. M. D. A., Sousa, M. A. S. B., Neto, E. B., & Oliveira, M. C. A. (2019). EVALUATION OF THE PURIFICATION PROCESS IN RHAMNOLIPID BIOSURFACTANT FOR APPLICATION IN MICROBIAL-ENHANCED OIL RECOVERY (MEOR). *Brazilian Journal of Petroleum and Gas*, 13(3). http://dx.doi.org/10.5419/bipg2019-0016

Ceresa, C., Fracchia, L., Williams, M., Banat, I. M., & De Rienzo, M. D. (2019). The effect of sophorolipids against microbial biofilms on medical-grade silicone. *Journal of Biotechnology*. https://doi.org/10.1016/j.jbiotec.2019.12.019

Chang, C. and Fogler H. S. (1994). Stabilization of Asphaltenes in Aliphatic Solvents Using Alkylbenzene-Derived Amphiphiles. 1. Effect of the Chemical Structure of Amphiphiles on Asphaltene Stabilization. *Langmuir*, 10, 1749-1757.

Chuo, S. C., Ahmad, A., Mohd-Setapar, S. H., Mohamed, S. F., & Rafatullah, M. (2019). Utilization of green sophorolipids biosurfactant in reverse micelle extraction of antibiotics: kinetic and mass transfer studies. *Journal of Molecular Liquids*, 276, 225-232. https://doi.org/10.1016/j.molliq.2018.11.138

Delbeke, E. I., Van Geem, K. M., Stevens, C. V., & Van Bogaert, I. N. (2018). Sophorolipid Modification: The Power of Yeasts and Enzymes. In *Lipid Modifcation by Enzymes and Engineered Microbes* (pp. 315-341). AOCS Press. https://doi.org/10.1016/B978-0-12-813167-1.00014-1 de Assunção, M. V. D., Vieira, M. M., & de Almeida, M. R. (2018). Fatores influenciadores na produção indesejada da água produzida de petróleo: um estudo na bacia Potiguar/Brasil. *HOLOS*, 2, 146-160. https://doi.org/10.15628/holos.2018.6479 de Oliveira, M. R., Magri, A., Baldo, C., Camilios-Neto, D., Minucelli, T., & Celligoi, M. A. P. C. (2015). Sophorolipids A promising biosurfactant and it's applications. *International Journal of Advanced Biotechnology and Research*, 6(2), 161-174.

Durand, E., Clemancey, M., Lancelin, J. M., Verstraete, J., Espinat, D., & Quoineaud, A. A. (2010). Effect of chemical composition on asphaltenes aggregation. *Energy & Fuels*, 24(2), 1051-1062. https://doi.org/10.1021/ef900599v El-Sheshtawy, H. S., & Khidr, T. T. (2016). Some biosurfactants used as pour point depressant for waxy egyptian crude oil. *Petroleum Science and Technology*, 34(16), 1475-1482. https://doi.org/10.1080/10916466.2016.1204317

Ganeeva, Y. M., Yusupova, T. Y. N., & Romanov, G. V. E. (2011). Asphaltene nano-aggregates: structure, phase transitions and effect on petroleum systems. *Russian Chemical Reviews*, 80(10), 993.

Gharbi, K., Benyounes, K., & Khodja, M. (2017). Removal and prevention of asphaltene deposition during oil production: A literature review. *Journal of Petroleum Science and Engineering*, 158, 351-360.

Hassan, H. S., Moamen, O. A., & Zaher, W. F. (2020). Adaptive Neuro-Fuzzy inference system analysis on sorption studies of strontium and cesium cations onto a novel impregnated nano-zeolite. *Advanced Powder Technology*. https://doi.org/10.1016/i.apt.2019.12.031

Honse, S. O., Ferreira, S. R., Mansur, C. R., Lucas, E. F., & González, G. (2012). Separation and characterization of asphaltenic subfractions. *Quimica Nova*, 35(10), 1991-1994. http://dx.doi.org/10.1590/S0100-40422012001000019

Imanbayev, Y., Tileuberdi, Y., Ongarbayev, Y., Mansurov, Z., Batyrbayev, A., Akkazin, Y., . . . & Rudyk, S. (2017). Changing the structure of resin-asphaltenes molecules in cracking. *Eurasian Chemico-TechnologicalJournal*, 19(2), 147-154. https://doi.org/10.18321/ectj645

Javanbakht, G., Sedghi, M., Welch, W. R., Goual, L., & Hoepfner, M. P. (2018). Molecular polydispersity improves prediction of asphaltene aggregation. *Journal of Molecular Liquids*, 256, 382-394. https://doi.org/10.1016/i.molliq.2018.02.051

Li, H., Guo, W., Ma, X. J., Li, J. S., & Song, X. (2017). In vitro and in vivo anticancer activity of sophorolipids to human cervical cancer. *Applied biochemistry and biotechnology*, 181(4), 1372-1387. https://doi.org/10.1007/s12010-016-2290-6

Lydon, H. L., Baccile, N., Callaghan, B., Marchant, R., Mitchell, C. A., & Banat, I. M. (2017). Adjuvant antibiotic activity of acidic sophorolipids with potential for facilitating wound healing. *Antimicrobial agents and chemotherapy*, 61(5), e02547-16. 10.1128/AAC.02547-16

KELLAND, A. M. Production chemicals for the oil and gas industry. [Flórida] CRC Press, 2009.

Marcelino, P. R. F., Gonealves, F., Jimenez, I. M., Cameiro, B. C., Santos, B. B., & da Silva, S. S. (2020). Sustainable Production of Biosurfactants and Their Applications. *Lignocellulosic Biorefining Technologies*, 159-183. https://doi.org/10.1002/9781119568858.ch8

Mohamed, A. M. O., El Gamal, M., & Zekri, A. Y. (2003). Effect of salinity and temperature on water cut determination in oil reservoirs. *Journal of Petroleum Science and Engineering*, 40(3-4), 177-188. https://doi.org/10.1016/S0920-4105(03)00137-2

Murgich, J., Merino-Garcia, D., Andersen, S. I., Manuel del Rio, J., & Galeana, C. L. (2002). Molecular mechanics and microcalorimetric investigations of the effects of molecular water on the aggregation of asphaltenes in solutions. *Langmuir*, 18(23), 9080-9086. https://doi.org/10.1021/la025882p Naughton, P. J., Marchant, R, Naughton, V., & Banat, I. M. (2019). Microbial biosurfactants: current trends and applications in agricultural and biomedical industries. *Journal of applied microbiology*, 127(1), 12-28. https://doi.org/10.1111/jam.14243

Nitschke, M., & Pastore, G. M. (2002). Biossurfactantes: propriedades e aplicações. *Quimica nova*, 25(5), 772-776. http://dx.doi.org/10.1590/SO100-40422002000500013

Okafor, H. E., Sukirman, Y., & Gholami, R. (2016, March). Adsorption and wettability study of methyl ester sulphonate on precipitated asphaltene. In *IOP Conference Series: Materials Science and Engineering* (Vol. 121, No. 1, p. 012016). IOP Publishing.

Ren, H., Zhou, S., Wang, B., Peng, L., & Li, X. (2020). Treatment mechanism of sludge containing highly viscous heavy oil using biosurfactant. *Colloids and Surfaces A: Physicochemical and Engineering Aspects*, $S$8S, 124117. https://doi.org/10.1016/j.colsurfa.2019.124117

Rogel, E., León, O., 2001. Study of the adsorption of alkyl-benzene-derived amphiphileson an asphaltene surface using molecular dynamics simulations. *Energy Fuels* 15, 1077-1086.https://doi.org/10.1021/efO00152f Rogel, E., Ovalles, C., & Moir, M. (2010). Asphaltene stability in crude oils and petroleum materials by solubility profile analysis. *Energy & fuels*, 24(8), 4369-4374. https://doi.org/10.1021/ef100478v Sabbah, H., Morrow, A. L., Pomerantz, A. E., & Zare, R. N. (2011). Evidence for island structures as the dominant architecture of asphaltenes. *Energy & Fuels*, 25(4), 1597-1604. https://doi.org/10.1021/ef101522w Sjöblom, J., Simon, S., & Xu, Z. (2015). Model molecules mimicking asphaltenes. *Advances in colloid and interface science*, 218, 1-16.

Shekhar, S., Sundaramanickam, A., & Balasubramanian, T. (2015). Biosurfactant producing microbes and their potential applications: a review. *Critical Reviews in Environmental Science and Technology*, 45(14), 1522-1554. https://doi.or/10.1080/10643389.2014.955631

Speight, J. G. (2014). *The chemistry and technology of petroleum*. CRC press.

Spiecker, P. M., Gawrys, K. L., & Kilpatrick, P. K. (2003). Aggregation and solubility behavior of asphaltenes and their subfractions. *Journal of colloid and interface science*, 267(1), 178-193. https://doi.org/10.1016/S0021-9797(03)00641-6

Subramanian, D., & Firoozabadi, A. (2015, November). Effect of surfactants and water on inhibition of asphaltene precipitation and deposition. In *Abu Dhabi International Petroleum Exhibition and Conference*. Society of Petroleum Engineers. https://doi.org/10.2118/177669-MS Thompson J., Aguiar, J. I. S. (2020) Saying goodbye to hot oiling. *Oilman Magazine*, January, 46-48, 2020. https://simplebooklet.com/embed.php?wpKev=b3fxt1PlO8Jyrcrvd5NNh1&source=wordpress#page=0

Wattana, P., Fogler, H. S., Yen, A., Carmen Garcia, M. D., & Carbognani, L. (2005). Characterization of polarity-based asphaltene subfractions. *Energy & fuels*, 19(1), 101-110. htts://doi.org/10.1021/ef1499372

We claim:

1. A method for preventing or reducing flocculation, precipitation, and/or deposition onto surfaces of asphaltene molecules present in crude oil, the method comprising contacting the crude oil with a composition comprising an asphaltene dispersant and/or asphaltene inhibitor, and a linear sophorolipid having the following structure:

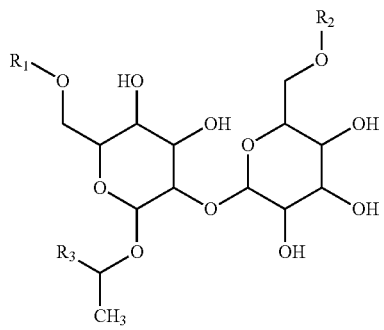

where $R_1$ and/or $R_2$ is a hydrogen group or an acetyl group, and $R_3$ is selected from the group consisting of

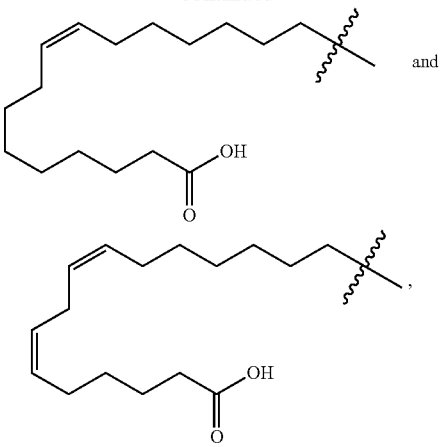

wherein the composition does not comprise any lactonic sophorolipid.

2. The method of claim 1, wherein the composition is injected into an oil well as a formation squeeze, a batch injection or a continuous injection.

3. The method of claim 1, wherein the composition is injected into a crude oil storage tank.

4. The method of claim 1, used to prevent or reduce blockage of tubing, pipes, and formation rock pores due to asphaltene deposition.

5. The method of claim 1, wherein the crude oil is heavy crude oil having an API gravity of 20° or less.

6. The method of claim 1, wherein the viscosity of the crude oil is reduced.

7. The method of claim 1, further comprising applying one or more additives in addition to the linear sophorolipid, wherein the one or more additives are selected from: solvents, enzymes, non-biological surfactants, polymers, chelating agents, emulsifying agents, demulsifiers, lubricants, buffering agents, solubility controlling agents, pH adjusting agents, preservatives and stabilizers.

8. The method of claim 1, wherein the one or more linear sophorolipids have a purity of at least 90%.

* * * * *